(12) United States Patent
Tillmann et al.

(10) Patent No.: US 12,476,237 B2
(45) Date of Patent: Nov. 18, 2025

(54) PROCESS FOR PREPARING SILICON-CONTAINING COMPOSITE PARTICLES

(71) Applicants: WACKER CHEMIE AG, Munich (DE); NEXEON LIMITED, Abingdon (GB)

(72) Inventors: Jan Tillmann, Munich (DE); Christoph Dräger, Munich (DE); Alena Kalyakina, Munich (DE); Sebastian Kneissl, Kolbermoor (DE); Thomas Renner, Munich (DE); Markus Anderson, Abingdon (GB); Charles A. Mason, Abingdon (GB); José Medrano-Catalan, Abingdon (GB); Richard Gregory Taylor, Penarth (GB); Joshua Whittam, East Hendred (GB)

(73) Assignees: Wacker Chemie AG, Munich (DE); Nexeon Limited, Abingdon (GB)

( * ) Notice: Subject to any disclaimer, the term of this patent is extended or adjusted under 35 U.S.C. 154(b) by 291 days.

(21) Appl. No.: 18/031,894

(22) PCT Filed: Oct. 22, 2021

(86) PCT No.: PCT/EP2021/079421
§ 371 (c)(1),
(2) Date: Apr. 14, 2023

(87) PCT Pub. No.: WO2022/084545
PCT Pub. Date: Apr. 28, 2022

(65) Prior Publication Data
US 2023/0395774 A1    Dec. 7, 2023

Related U.S. Application Data

(63) Continuation of application No. PCT/EP2020/083885, filed on Nov. 30, 2020.

(30) Foreign Application Priority Data

Oct. 23, 2020 (GB) ..................................... 2016900

(51) Int. Cl.
*C23C 16/04* (2006.01)
*C04B 35/528* (2006.01)
(Continued)

(52) U.S. Cl.
CPC ......... *H01M 4/0428* (2013.01); *C04B 35/528* (2013.01); *C04B 35/62839* (2013.01); *C04B 35/62884* (2013.01); *C04B 35/62894* (2013.01); *C23C 16/045* (2013.01); *C23C 16/24* (2013.01); *C23C 16/26* (2013.01); *C23C 16/4417* (2013.01); *H01M 4/1395* (2013.01); *H01M 4/362* (2013.01); *H01M 4/386* (2013.01); *H01M 4/625* (2013.01); *C04B 2235/422* (2013.01); *C04B 2235/428* (2013.01);
(Continued)

(58) Field of Classification Search
CPC .................. C23C 16/045; C23C 16/26; C23C 16/4417; C04B 35/528; C04B 35/62839; C04B 35/62884; C04B 35/62894
See application file for complete search history.

(56) References Cited

U.S. PATENT DOCUMENTS 10,147,950 B2  12/2018  Sakshaug et al.
10,508,335 B1  12/2019  Yilmaz et al.
(Continued)

FOREIGN PATENT DOCUMENTS

GB    2580110 A          7/2020
JP    4484193       *    4/2010   ............. C01B 33/12
(Continued)

OTHER PUBLICATIONS

Bley, Richard A., et al., "Characterization of Silicon Nanoparticles Prepared from Porous Silicon". Chem. Mater. 1996, 8, 1881-1888.*
Ota, Michiya, et al., "Preparation of Silicon Nanoparticles by Pyrolysis of Organosilicon Compounds inside the Porous Carbon". Journal of Materials Science and Chemical Engineering, 2020, 8, 1-6.*
Bogush, G.H., et al., "Preparation of Monodisperse Silica Particles: Control of Size and Mass Fraction". Journal of Non-Crystalline Solids 104 (1988) 95-106.*
Ibrahim, Ismail A. M., et al., "Preparation of spherical silica nanoparticles: Stober silica". Journal of American Science, 2010; 6 (11) pp. 985-989.*
Nishikawa, Kei, et al., "In-situ observation of volume expansion behavior of a silicon particle in various electrolytes". Journal of Power Sources, vol. 302, Jan. 20, 2016, pp. 46-52.*
(Continued)

*Primary Examiner* — Bret P Chen
(74) *Attorney, Agent, or Firm* — BROOKS KUSHMAN P.C.

(57) ABSTRACT

Silicon-containing composite particles, the process comprising the steps of:
(a) providing a plurality of porous particles comprising micropores and/or mesopores, wherein the $D_{50}$ particle diameter of the porous particles from 0.5 to 200 µm; the total pore volume of micropores and mesopores is from 0.4 to 2.2 cm$^3$/g; and the $PD_{50}$ pore diameter is no more than 30 nm; c
(b) combining a charge of the porous particles with a charge of a silicon-containing precursor in a batch pressure reactor, wherein the charge of porous particles has a volume of at least 20 cm$^3$ per litre of reactor volume (cm$^3$/L$_{RV}$), and wherein the charge of the silicon-containing precursor comprises at least 2 g of silicon per litre of reactor volume (g/L$_{RV}$); and
(c) heating the reactor to a temperature effective to cause deposition of silicon in the pores of the porous particles, thereby providing the silicon-containing composite particles.

41 Claims, 1 Drawing Sheet

(51) Int. Cl.
  *C04B 35/628* (2006.01)
  *C23C 16/24* (2006.01)
  *C23C 16/26* (2006.01)
  *C23C 16/44* (2006.01)
  *H01M 4/04* (2006.01)
  *H01M 4/1395* (2010.01)
  *H01M 4/36* (2006.01)
  *H01M 4/38* (2006.01)
  *H01M 4/62* (2006.01)
  *H01M 4/02* (2006.01)

(52) U.S. Cl.
  CPC ............ *C04B 2235/5409* (2013.01); *C04B 2235/5436* (2013.01); *C04B 2235/5445* (2013.01); *H01M 2004/021* (2013.01); *H01M 2004/027* (2013.01)

(56) References Cited

U.S. PATENT DOCUMENTS

| | | | |
|---|---|---|---|
| 2002/0051878 A1* | 5/2002 | Lussier | B01J 35/30 208/213 |
| 2007/0082128 A1* | 4/2007 | Dittmeyer | C01B 3/505 427/248.1 |
| 2011/0085961 A1* | 4/2011 | Noda | B01J 8/0055 422/198 |
| 2017/0363607 A1* | 12/2017 | Tian | C23C 16/045 |
| 2019/0097222 A1* | 3/2019 | Feaver | H01M 4/587 |
| 2019/0127226 A1* | 5/2019 | Hofmann | B01J 20/20 |
| 2019/0166685 A1* | 5/2019 | Lee | H01L 21/563 |
| 2020/0020935 A1 | 1/2020 | Costantino et al. | |
| 2020/0194778 A1* | 6/2020 | Troegel | H01M 4/625 |

FOREIGN PATENT DOCUMENTS

| | | | | |
|---|---|---|---|---|
| WO | WO 2007/037787 A1 * | 4/2007 | | C01B 33/02 |
| WO | 2007083155 A1 | 7/2007 | | |
| WO | 2012097969 A1 | 7/2012 | | |
| WO | 2017040299 A1 | 3/2017 | | |
| WO | 2020095067 A1 | 5/2020 | | |
| WO | 2020128495 A1 | 6/2020 | | |

OTHER PUBLICATIONS

M. Winter et al., Insertion Electrode Materials for Rechargeable Lithium Batteries, Adv. Mater. 1998, 10, No. 10, pp. 725-763, WYLEY (Germany).

X. Guo et al., Improving coulombic efficiency by confinement of solid electrolyte interphase film in pores of silicon/carbon composite,Journal of Materials Chemistry A, 2013, pp. 14075-14079, The Royal Society of Chemistry (UK).

S.P. Motevalian et al., Kinetics of Silane Decomposition in High-Pressure Confined Chemical Vapor Deposition of Hydrogenated Amorphous Silicon, Ind. Eng. Chem. Res. 2017, 56, pp. 14995-15000, ACS Publications (USA).

J.O. Odden et al., From monosilane to crystalline silicon, Part I: Decomposition of monosilane at 690-830 K and Initial pressures 0.1-6.6 MPa in a free-space reactor, Solar Energy Mat. & Solar Cells 2005, 86, pp. 165-176, Elsevier B.V. (NL).

P.A. Webb and C. Orr, Analytical Methods in Fine Particle Technology, 1997, Chapter 4, Pore Structure by Mercury Instrusion Porosimetry (MIP), pp. 155-191. Micromeritics Instrument Corporation, Norcross GA (US) ISBN 0-9656783-0-X.

B. Bardet et al., In situ investigation of mesoporous silicon oxidation kinetics using infrared emittance spectroscopy, Phys. Chem. Chem. Phys. 2016, 18, 18201-18208, The Owner Societies (CA).

* cited by examiner

PROCESS FOR PREPARING SILICON-CONTAINING COMPOSITE PARTICLES

CROSS REFERENCE TO RELATED APPLICATIONS

This application is the U.S. National Phase of PCT Appln. No. PCT/EP2021/079421 filed Oct. 22, 2021, which claims priority to Great Britain Application No. 2016900.9 filed Oct. 23, 2020 & PCT/EP2020/083885, filed Nov. 30, 2020, the disclosures of which are incorporated in their entirety by reference herein.

BACKGROUND OF THE INVENTION

1. Field of the Invention

The invention relates in general to a process for preparing silicon-containing composite particles by deposition of silicon in pores of porous particles. Silicon-containing composite particles are generally suitable for use as anode active materials in rechargeable metal-ion batteries.

2. Description of the Related Art

Rechargeable metal-ion batteries are widely used in portable electronic devices such as mobile telephones and laptops and are finding increasing application in electric or hybrid vehicles. Rechargeable metal-ion batteries generally comprise an anode in the form of a metal current collector provided with a layer of an electroactive material, defined herein as a material which is capable of inserting and releasing metal ions during the charging and discharging of a battery. The terms "cathode" and "anode" are used herein in the sense that the battery is placed across a load, such that the anode is the negative electrode. When a metal-ion battery is charged, metal ions are transported from the metal-ion-containing cathode layer via the electrolyte to the anode and are inserted into the anode material. The term "battery" is used herein to refer both to a device containing a single anode and a single cathode and to devices containing a plurality of anodes and/or a plurality of cathodes.

There is interest in improving the gravimetric and/or volumetric capacities of rechargeable metal-ion batteries. To date, commercial lithium-ion batteries have largely been limited to the use of graphite as an anode active material. When a graphite anode is charged, lithium intercalates between the graphite layers to form a material with the empirical formula $Li_xC_6$ (wherein x is greater than 0 and less than or equal to 1). Consequently, graphite has a maximum theoretical capacity of 372 mAh/g in a lithium-ion battery, with a practical capacity that is somewhat lower (ca. 340 to 360 mAh/g). Other materials, such as silicon, tin and germanium, are capable of intercalating lithium with a significantly higher capacity than graphite but have yet to find widespread commercial use due to difficulties in maintaining sufficient capacity over numerous charge/discharge cycles.

Silicon in particular has been identified as a promising alternative to graphite for the manufacture of rechargeable metal-ion batteries having high gravimetric and volumetric capacities because of its very high capacity for lithium (see, for example, Insertion Electrode Materials for Rechargeable Lithium Batteries, Winter, M. et al. in Adv. Mater. 1998, 10, No. 10). At room temperature, silicon has a theoretical maximum specific capacity in a lithium-ion battery of about 3,600 mAh/g (based on $Li_{15}Si_4$). However, the intercalation of lithium into bulk silicon leads to a large increase in the volume of the silicon material of up to 400% of its original volume when silicon is lithiated to its maximum capacity. Repeated charge-discharge cycles cause significant mechanical stress in the silicon material, resulting in fracturing and delamination of the silicon anode material. Volume contraction of silicon particles upon dilithiation can result in a loss of electrical contact between the anode material and the current collector. A further difficulty is that the solid electrolyte interphase (SEI) layer that forms on the silicon surface does not have sufficient mechanical tolerance to accommodate the expansion and contraction of the silicon. As a result, newly exposed silicon surfaces lead to further electrolyte decomposition and increased thickness of the SEI layer and irreversible consumption of lithium. These failure mechanisms collectively result in an unacceptable loss of electrochemical capacity over successive charging and discharging cycles.

A number of approaches have been proposed to overcome the problems associated with the volume change observed when charging silicon-containing anodes. It has been reported that fine silicon structures below around 150 nm in cross-section, such as silicon films and silicon nanoparticles are more tolerant of volume changes on charging and discharging when compared to silicon particles in the micron size range. However, neither of these is suitable for commercial scale applications in their unmodified form; nanoscale particles are difficult to prepare and handle and silicon films do not provide sufficient bulk capacity.

WO 2007/083155 discloses that improved capacity retention may be obtained with silicon particles having high aspect ratio, i.e. the ratio of the largest dimension to the smallest dimension of the particle. The small cross-section of such particles reduces the structural stress on the material due to volumetric changes on charging and discharging. However, such particles may be difficult and costly to manufacture and can be fragile. In addition, high surface area may result in excessive SEI formation, resulting in excessive loss of capacity on the first charge-discharge cycle.

It is also known in general terms that electroactive materials such as silicon may be deposited within the pores of a porous carrier material, such as an activated carbon material. These composite materials provide some of the beneficial charge-discharge properties of nanoscale silicon particles while avoiding the handling difficulties of nanoparticles. Guo et al. (Journal of Materials Chemistry A. 2013, pp. 14075-14079) discloses a silicon-carbon composite material in which a porous carbon substrate provides an electrically conductive framework with silicon nanoparticles deposited within the pore structure of the substrate with uniform distribution. It is shown that the composite material has improved capacity retention over multiple charging cycles, however the initial capacity of the composite material in mAh/g is significantly lower than for silicon nanoparticles.

The present inventors have previously reported the development of a class of electroactive materials having a composite structure in which nanoscale electroactive materials, such as silicon, are deposited into the pore network of a highly porous conductive particulate material, e.g. a porous carbon material.

For example, WO 2020/095067 and WO 2020/128495 report that the improved electrochemical performance of these materials can be attributed to the way in which the electroactive materials are located in the porous material in the form of small domains with dimensions of the order of a few nanometres or less. These fine electroactive structures are thought to have a lower resistance to elastic deformation and higher fracture resistance than larger electroactive structures, and are therefore able to lithiate and delithiate without excessive structural stress. As a result, the electroactive materials exhibit good reversible capacity retention over multiple charge-discharge cycles. Secondly, by controlling the loading of silicon within the porous carbon framework such that only part of the pore volume is occupied by silicon in the uncharged state, the unoccupied pore volume of the porous carbon framework is able to accommodate a substantial amount of silicon expansion internally. Furthermore, by locating nanoscale silicon domains within small mesopores and/or micropores as described above, only a small area of silicon surface is accessible to electrolyte and so SEI formation is limited. Additional exposure of silicon in subsequent charge-discharge cycles is substantially prevented such that SEI formation is not a significant failure mechanism leading to capacity loss. This stands in clear contrast to the excessive SEI formation that characterizes the material disclosed by Guo, for example (see above).

The materials described in WO 2020/095067 and WO 2020/128495 has been synthesized by chemical vapour infiltration (CVI) in different reactor systems (static, rotary and FBR). The porous conductive particles are contacted with a flow of a silicon-containing precursor (CVI), typically silane gas, as a mixture with inert gas, at atmospheric pressure and at temperatures between 400 to 700° C. All these reactor configurations work as a batch mode for the solid carbon scaffold and as continuous mode for the silicon precursor gas. The reaction rate of silane at these temperatures is fast, however, the silane molecules need to go through a tortuous path across the pore system of the solid particle. This means, that to obtain a homogeneous infiltration in such reactor systems, the temperatures need to be relatively high to avoid the mass transfer becoming a rate limiting step. The overall result is the formation of a composite product with relatively high surface area and relatively lower hydride terminated silicon content on average. Both of these factors are believed to contribute to reduced electrochemical performance.

Another drawback of the systems that use a continuous flow of a silicon-containing precursor gas is that a good mixing of the solids within the gas is required, otherwise the product batch may comprise compositional inhomogeneities. In the absence of effective mixing, the solids having a higher contact time with the gas will comprise a higher quantity of silicon than those with a shorter contact time with the unreacted silane gas flow; the deposition is not equal across the powder bed.

Simply reducing the temperature of the CVI process does not overcome the aforementioned drawbacks. If temperatures are low, mass transfer becomes a rate limiting step, leading to poor infiltration of the porous carbon framework, non-homogeneous silicon distribution, and the formation of coarse silicon domains.

U.S. Pat. No. 10,147,950 B2 describes the deposition of silicon from monosilane, $SiH_4$, in a porous carbon in a tube furnace or comparable furnace types at 300 to 900° C., preferably with agitation of the particles, through a CVO process (chemical vapour deposition). This process employs a mixture of 2 mol % of monosilane with nitrogen as inert gas. Such conditions require very long reaction times. U.S. Pat. No. 10,147,950 S2 mentions various temperature ranges and various pressure ranges.

WO 20121097969 A1 describes the deposition of ultra-fine silicon particles in the range from 1 to 20 nm through heating of silanes as silicon precursor on porous carbon supports at 200 to 950° C., the silane being diluted with an inert gas in order to prevent agglomeration of the deposited silicon particles and/or formation of thick layers; the deposition takes place in a pressure range from 0.1 to 5 bar.

Motevalian et al, Ind. Eng. Chem. Res. 2017, 56, 14995, describe the deposition of silicon layers at elevated pressure, albeit not in the presence of a porous matrix. Again, the silicon precursor used, in this case monosilane, $SiH_4$, is present only at a low concentration of at most 5 mol % in the overall gas volume.

The processes described above generally necessitate long reaction times in order to achieve high silicon fractions in the silicon-containing composite particles. Another disadvantage with these processes is that only a small part of the reactive gas supplied undergoes reaction, and so the gas leaving the reactor must undergo a costly and inconvenient operation of recycling or disposal, which further increases the costs, particularly when using silicon precursors, which are subject to demanding technical safety requirements.

There is therefore a need in the art for a process for preparing silicon-containing composite particles, which reduces or even overcomes at least one of the above discussed drawbacks, preferably the discussed drawbacks of high and lower temperature CVI processes or long reaction times. The process starting from porous particles and silicon precursors is preferably technically simple to implement. The silicon-containing composite particles have preferably high storage capacity for lithium ions, which when used as an active material in anodes of lithium-ion batteries enable preferably high cycling stability.

SUMMARY OF THE INVENTION

Porous particles having silicon deposited within their pores are produced in a batch-wise manner, by introducing porous carbon particles into a pressure reactor, introducing a silicon precursor gas into the reactor and heating the reactor to a temperature at which the silicon precursor decomposes and deposits silicon, wherein during the deposition of silicon, the pressure within the reactor is preferably increased to at least 7 bar.

DETAILED DESCRIPTION OF THE PREFERRED EMBODIMENTS

Figure 1:
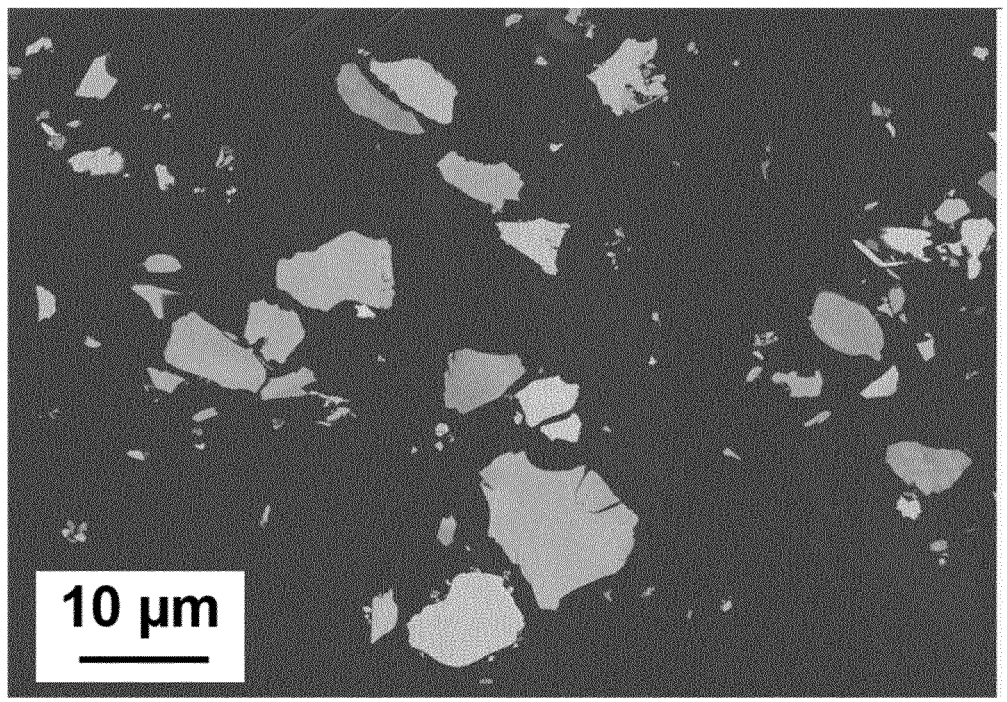
FIG. 1 illustrates the silicon distribution from Example 1.

In a first aspect, the invention provides a process for preparing silicon-containing composite particles, the process comprising the steps of:
(a) providing a plurality of porous particles comprising micropores and/or mesopores, wherein:
(i) the $D_{50}$ particle diameter of the porous particles is in the range from 0.5 to 200 μm;
(ii) the total pore volume of micropores and mesopores as measured by gas adsorption is in the range from 0.4 to 2.2 cm$^3$/g;
(iii) the $PD_{50}$ pore diameter as measured by gas adsorption is no more than 30 nm;
(b) combining a charge of the porous particles with a charge of a silicon-containing precursor in a batch pressure reactor, wherein the charge of the porous particles has a volume of at least 20 cm³ per litre of reactor volume (cm³/L$_{RV}$), preferably at least 200 cm³ per litre of reactor volume (cm³/L$_{RV}$), and wherein the charge of the silicon-containing precursor comprises at least 2 g of silicon per litre of reactor volume (g/L$_{RV}$); and (c) heating the reactor to a temperature effective to cause deposition of silicon in the pores of the porous particles, thereby providing the silicon-containing composite particles.

In a preferred embodiment of the instant process according to the first aspect of the invention, the above steps a)–c), particularly the above steps b)–c), are divided into process Phases 1 to 7:

Phase 1: charging the batch pressure reactor with one or more porous particles,

Phase 2: charging the batch pressure reactor with one or more silicon-containing precursors, Phase 3: heating the batch pressure reactor to a target temperature, at which one or more silicon-containing precursors begin to decompose in the batch pressure reactor, Phase 4: decomposing silicon-containing precursors, with deposition of silicon in pores and optionally on the surface of the porous particles, thereby providing the silicon-containing composite particles, Phase 5: cooling the batch pressure reactor, Phase 6: removing gaseous reaction products, formed in the course of the deposition, from the batch pressure reactor, Phase 7: withdrawing silicon-containing composite particles from the batch pressure reactor, characterized in that during Phase 4, the pressure in the batch pressure reactor increases to at least 7 bar.

Preferred is also a process for preparing silicon-containing composite particles by thermal decomposition of one or more silicon-containing precursors in the presence of one or more porous particles, where silicon is deposited in pores and optionally on the surface of the porous particles, the process comprising at least Phases 1 to 7:

Phase 1: charging the batch pressure reactor with one or more porous particles,
wherein the charge of the porous particles has a volume of at least 20 cm³ per litre of reactor volume (cm³/L$_{RV}$), preferably at least 200 cm³ per litre of reactor volume (cm³/L$_{RV}$), and
wherein porous particles comprise micropores and/or mesopores, wherein:
(i) the D$_{50}$ particle diameter of the porous particles is in the range from 0.5 to 200 μm;
(ii) the total pore volume of micropores and mesopores as measured by gas adsorption is in the range from 0.4 to 2.2 cm³/g;
(iii) the PD$_{50}$ pore diameter as measured by gas adsorption is no more than 30 nm.

Phase 2: charging the batch pressure reactor with one or more silicon-containing precursors, wherein the charge of the silicon-containing precursor comprises at least 2 g of silicon per litre of reactor volume (g/L$_{RV}$), Phase 3: heating the batch pressure reactor to a target temperature, at which one or more silicon-containing precursors begin to decompose in the batch pressure reactor, Phase 4: decomposing silicon-containing precursors, with deposition of silicon in pores and optionally on the surface of the porous particles, thereby providing the silicon-containing composite particles.

Phase 5: cooling the batch pressure reactor,

Phase 6: removing gaseous reaction products, formed in the course of the deposition, from the batch pressure reactor, Phase 7: withdrawing silicon-containing composite particles from the batch pressure reactor, wherein during Phase 4, the pressure in the batch pressure reactor increases to at least 7 bar.

In a further aspect, the invention provides a process for preparing silicon-containing composite particles by thermal decomposition of one or more silicon-containing precursor in the presence of one or more porous particles, where silicon is deposited in pores, preferably in pores and on the surface, of porous particles, comprising at least Phases 1 to 7:

Phase 1: charging a batch pressure reactor with one or more porous particles,

Phase 2: charging the batch pressure reactor with one or more silicon-containing precursors, Phase 3: heating the batch pressure reactor to a target temperature, at which one or more silicon-containing precursors begin to decompose in the batch pressure reactor, Phase 4: decomposing silicon-containing precursors, with deposition of silicon in pores, preferably in pores and on the surface, of the porous particles, Phase 5: cooling the batch pressure reactor.

Phase 6: removing gaseous reaction products, formed in the course of the deposition, from the batch pressure reactor, Phase 7: withdrawing silicon-containing composite particles from the batch pressure reactor,
characterized in that during Phase 4 of the process, the pressure in the batch pressure reactor increases to at least 7 bar.

Preferred is also a process for preparing silicon-containing composite particles by thermal decomposition of one or more silicon-containing precursors in the presence of one or more porous particles, where silicon is deposited in pores, preferably in pores and on the surface, of porous particles, comprising at least Phases 1 to 7:

Phase 1: charging a batch pressure reactor with one or more porous particles,
wherein the charge of the porous particles has a volume of at least 20 cm³ per litre of reactor volume (cm³/L$_{RV}$), preferably at least 200 cm³ per litre of reactor volume (cm³/L$_{RV}$), and
wherein porous particles comprise micropores and/or mesopores, wherein:
(i) the D$_{50}$ particle diameter of the porous particles is in the range from 0.5 to 200 μm;
(ii) the total pore volume of micropores and mesopores as measured by gas adsorption is in the range from 0.4 to 2.2 cm³/g;
(iii) the PD$_{50}$ pore diameter as measured by gas adsorption is no more than 30 nm, Phase 2: charging said batch pressure reactor with one or more silicon-containing precursors, wherein the charge of the silicon-containing precursor comprises at least 2 g of silicon per litre of reactor volume (g/L$_{RV}$), Phase 3: heating said batch pressure reactor to a target temperature, at which one or more silicon-containing precursors begin to decompose in the batch pressure reactor, Phase 4: decomposing silicon-containing precursors, with deposition of silicon in pores, preferably in pores and on the surface, of the porous particles, Phase 5: cooling the batch pressure reactor, Phase 6: removing gaseous reaction products, formed in the course of the deposition, from the batch pressure reactor, Phase 7: withdrawing silicon-containing composite particles from the batch pressure reactor, characterized in that during Phase 4 of the process, the pressure in the batch pressure reactor increases to at least 7 bar.

Just for clarification, the preferred embodiments and alternative embodiments described in the following refer to each of the above described aspects of the instant invention and to each of the above described preferred processes of the instant invention.

The invention therefore relates in general terms to a process for preparing a composite particulate material in which nanoscale silicon domains are deposited into the pore network of porous particles. The porous particles therefore form a framework containing the nanoscale silicon domains. As used herein, the term "nanoscale silicon domain" refers to a nanoscale body of silicon having dimensions that are imposed by the location of the silicon within the micropores and/or mesopores of the porous particles.

The process of the present invention differs from the prior methodology insofar as the deposition of silicon is carried out in batch mode for both the porous particles and the silicon-containing precursor. In addition, the respective charges of the porous particles and the silicon-containing precursor per litre of reactor volume means that the deposition of silicon is carried out at an autogenous pressure, which is above atmospheric pressure, and may be higher than atmospheric pressure by at least one or even two orders of magnitude.

The present process is associated with a number of advantages, in particular also because of the charging of the silicon-containing precursor in the batch pressure reactor and the parameters according to the invention. The advantageous effects can be further increased in a synergistic manner by the preferred pressure measures.

Firstly, the silicon-containing precursor can be distributed through the whole volume of the reactor. Therefore, the reaction can take place at any point of the reactor to the same conversion level particularly as long as there are no temperature profiles. Inhomogeneous product composition due to contact of the solids with the gas flow is avoided and the material can have the same properties independently of its position within the reactor. The batch composition would be preferably homogeneous.

Secondly, the silicon-containing precursor can be distributed through the porous system of the porous particles before reaction takes place. Therefore, mass transfer limitations can be reduced as the silicon-containing precursor is already present within the pores at the start of the reaction. Furthermore, the batch reactor can be charged with a large amount of the porous particles to reduce or even eliminate the headspace in the reactor, such that any silicon-containing precursor molecules present in the remaining reactor volume outside of the pore volume of the porous particles (e.g in the interstitial spaces) has only a short mean free path to the nearest particle.

Thirdly, the higher the pressure, the higher the quantity of silane that can be fed into the reactor in one batch. Silane is supercritical over 47.8 atm and a high loading of silicon can be introduced in a single batch at ambient temperature due to the compressibility factor in such conditions.

Surprisingly, the instant batch process enables preparation of silicon-containing composite particles in shorter reaction times and, therefore, in a more efficient manner. The instant process surprisingly enables the decomposition of increased amounts of silicon-containing precursor particularly within the porous particles and, hence, increased corresponding amounts of deposited silicon within the porous particles. Moreover, the deposition of silicon is particularly uniform. This can be further improved by the preferred pressures of the instant invention. This was particularly surprising insofar as it is known, from processes for producing polycrystalline silicon, that the deposition of silicon at relatively high pressure is accompanied by increased and unwanted formation of dust (J. O. Odden et al., Solar Energy Mat. & Solar Cells 2005, 86, 165), which is counterproductive both to the deposition of silicon on the inner surface of the pores and on the outer surface of the porous particles and for the yield of composite particles. This deleterious effect is surprisingly overcome by the process of the invention. These effects are particularly pronounced at the instant pressures, particularly at at least 7 bar.

Fourthly, the temperature is generally raised to the deposition temperature only after the charge of the reactor with the silicon-containing precursor under pressure. This also introduces a new way of controlling the reaction rate and the product composition. The deposition of higher hydrogenated silicon can take place at lower temperatures as the system doesn't have to deal with mass transfer limitations. Therefore, product composite particles with a lower surface area and higher hydride terminated silicon can be obtained in comparison to the atmospheric pressure synthesis routes.

The instant process for producing silicon-containing composite particles offers a variety of advantages relative to the prior art. A particular advantage is the possibility for complete conversion of the silicon precursor In a short reaction time. These advantages are preferably further enhanced by a pressure increase in the batch pressure reactor during step (c) or Phase 4, which is not or not only caused by a temperature increase.

Another advantage is the possibility of reducing the amount of inert gas or of avoiding inert gas entirely, which likewise leads to higher space/time yields and therefore enables a more rapid and uniform deposition of silicon in or on the porous particles.

Furthermore, it is possible to prevent the continuous recycling or processing of the reactor offgas, as usually arises in the operation of an open reactor.

In addition, implementation in a batch pressure reactor makes it very easy to carry out multiple depositions from the same reactive component, such as silicon-containing precursor, with a precisely adjustable amount of deposition product, based on the reactant in the respective deposition step.

The silicon-containing composite particles obtained from the process of the invention are therefore preferably distinguished by the advantageous homogeneity of the layers deposited.

A particular advantage, moreover, is that the dust creation often described can be avoided. This can be achieved, for example, by the large surface area of the porous particles, which is made available for the deposition of silicon from the silicon-containing precursor, and also by the intense penetration of the porous particles with the silicon-containing precursor. At the same time, a high yield of deposited silicon is obtained in this way.

Furthermore, the instant process starting from porous particles and silicon precursors is technically simple to implement.

As a result of the advantages of the process of the invention, silicon-containing composite particles are advantageously accessible rapidly and economically, particularly for use as an active material for anodes of lithium-ion batteries with outstanding properties.

Surprisingly, the silicon-containing composite particles produced according to the instant process have high storage capacity for lithium ions, which, when used as an active material in anodes of lithium-ion batteries, enable surprisingly high cycling stability. The instant silicon-containing composite show advantageously low change in volume during cycling.

Silicon-containing composite particles can be obtained with the process of the invention having improved characteristics for use in lithium-ion batteries having high volumetric energy capacities. The silicon-containing material obtained by the process of the invention is permeable to lithium ions and also electrons, and therefore allows charged transport. Additionally, the amount of decomposition electrolyte solvents and the formation of solid electrolyte interphases (the "SEI") can be reduced by the present approach. Excess SEI is known to negatively impact on the cycling efficiency of lithium-ion batteries.

For the avoidance of doubt, the term "particle diameter" as used herein refers to the equivalent spherical diameter (esd), i.e. the diameter of a sphere having the same volume as a given particle, wherein the particle volume is understood to include the volume of any intra-particle pores. The terms "$D_{50}$" and "$D_{50}$ particle diameter" as used herein refer to the volume-based median particle diameter, i.e. the diameter below which 50% by volume of the particle population is found. The terms "$D_{10}$" and "$D_{10}$ particle diameter" as used herein refer to the 10th percentile volume-based median particle diameter, i.e. the diameter below which 10% by volume of the particle population is found. The terms "$D_{90}$" and "$D_{90}$ particle diameter" as used herein refer to the 90th percentile volume-based median particle diameter, i.e. the diameter below which 90% by volume of the particle population is found.

Particle diameters and particle size distributions can be determined by standard laser diffraction techniques in accordance with ISO 13320:2009. Laser diffraction relies on the principle that a particle will scatter light at an angle that varies depending on the size the particle and a collection of particles will produce a pattern of scattered light defined by intensity and angle that can be correlated to a particle size distribution. A number of laser diffraction instruments are commercially available for the rapid and reliable determination of distributions. Unless stated otherwise, particle size distribution measurements as specified or reported herein are as measured by the conventional Malvern Mastersizer™ 3000 particle size analyzer from Malvern Instruments™. The Malvern Mastersizer™ 3000 particle size analyzer operates by projecting a helium-neon gas laser beam through a transparent cell containing the particles of interest suspended in an aqueous solution. Light rays which strike the particles are scattered through angles which are inversely proportional to the particle size and a photodetector array measures the intensity of light at several predetermined angles and the measured intensities at different angles are processed by a computer using standard theoretical principles to determine the particle size distribution. Laser diffraction values as reported herein are obtained using a wet dispersion of the particles in 2-propanol with a 5 vol % addition of the surfactant SPAN™-40 (sorbitan monopalmitate). The particle refractive index is taken to be 2.68 for porous particles and 3.50 for composite particles and the dispersant index is taken to be 1.378. Particle size distributions are calculated using the Mie scattering model.

Alternatively, the particle diameters and the particle size distributions can be determined according to ISO 13320 by means of static laser scattering using the Mie model and the measuring instrument a Horiba LA 950, using preferably ethanol as dispersing medium for the particles.

In general, the porous particles have a $D_{50}$ particle diameter in the range from 0.5 to 200 µm. Optionally, the $D_{50}$ particle diameter of the porous particles may be at least 1 µm, or at least 1.5 µm, or at least 2 µm, or at least 3 µm, or at least 4 µm, or at least 5 µm. Optionally the $D_{50}$ particle diameter of the porous particles may be no more than 150 µm, or no more than 100 µm, or no more than 70 µm, or no more than 50 µm, or no more than 40 µm, or no more than 30 µm, or no more than 25 µm, or no more than 20 µm, or no more than 18 µm, or no more than 15 µm, or no more than 12 µm, or no more than 10 µm.

For instance, the porous particles may have a $D_{50}$ particle diameter in the range from 0.5 to 150 µm, or from 0.5 to 100 µm, or from 0.5 to 50 µm, or from 0.5 to 30 µm, or from 1 to 25 µm, or from 1 to 20 µm, or from 2 to 25 µm, or from 2 to 20 µm, or from 2 to 18 µm, or from 3 to 20 µm, or from 3 to 18 µm, or from 3 to 15 µm, or from 4 to 18 µm, or from 4 to 15 µm, or from 4 to 12 µm, or from 5 to 15 µm, or from 5 to 12 µm or from 5 to 10 µm. Particles within these size ranges and having porosity and a pore diameter distribution as set out herein are ideally suited for the preparation of composite particles for use in anodes for metal-ion batteries by a CVI process.

The $D_{10}$ particle diameter of the porous particles is preferably at least 0.2 µm, or at least 0.5 µm, or at least 0.8 µm, or at least 1 µm, or at least 1.5 µm, or at least 2 µm. By maintaining the $D_{10}$ particle diameter at 0.2 µm or more, the potential for undesirable agglomeration of sub-micron sized particles is reduced, and improved dispersibility of the composite particles formed. The $D_{10}$ particle diameter is preferably ≤10 µm, more preferably 55 µm and most preferably ≤3 µm.

The $D_{90}$ particle diameter of the porous particles is preferably no more than 300 µm, or no more than 250 µm, or no more than 200 µm, or no more than 150 µm, or no more than 100 µm, or no more than 80 µm, or no more than 60 µm, or no more than 40 µm, or no more than 30 µm, or no more than 25 µm, or no more than 20 µm, more preferably no more than 18 µm, even more preferably no more than 15 µm and most preferably no more than 13 µm. The $D_{90}$ particle diameter is preferably ≥4 µm and more preferably ≥8 µm.

The volume-weighted particle size distribution of the porous particles is preferably between the diameter percentiles $d_{10} \geq 0.2$ µm and $d_{90} \leq 20.0$ µm, more preferably between $d_{10} \geq 2:0.4$ µm and $d_{90} \leq 15.0$ µm, and most preferably $d_{10} \geq 0.6$ µm to $d_{90} \leq 12.0$ µm.

The porous particles preferably have a narrow size distribution span. For instance, the particle size distribution span (defined as $(D_{90}-D_{10})/D_{50}$) is preferably 5 or less, more preferably 4 or less, more preferably 3 or less, more preferably 2 or less, and most preferably 1.5 or less. By maintaining a narrow size distribution span, efficient packing of the particles into dense powder beds is more readily achievable.

The volume-weighted particle size distribution of the porous particles has a difference in the $d_{90}$ and $d_{10}$ values (a $D_{90}-D_{10}$ differential) of preferably ≤15.0 µm, more preferably ≤12.0 µm, very preferably ≤10.0 µm, especially preferably ≤8.0 µm, and most preferably ≤4.0 µm. The volume-weighted particle size distribution of the porous particles has a $d_{90}-d_{10}$ differential of preferably ≥0.6 µm, more preferably ≥0.8 µm and most preferably ≥1.0 µm.

The porous particles are preferably present in the form of isolated or agglomerated particles.

The porous particles are preferably not aggregated and preferably not agglomerated. Aggregated means generally that in the course of the production of the porous particles, initially primary particles are formed and undergo fusion, and/or primary particles are linked to one another via covalent bonds, for example, and in this way form aggregates. Primary particles are generally isolated particles. Aggregates or isolated particles can form agglomerates. Agglomerates are a loose coalition of aggregates or primary particles, which are linked to one another for example via Van der Waals interactions or hydrogen bonds. Agglomerated aggregates can easily be split back into aggregates by conventional kneading and dispersing techniques. Aggregates cannot be disintegrated, or can be disintegrated only partly, into primary particles by these techniques. The presence of the porous particles in the form of aggregates, agglomerates or isolated particles can be made visible, for example, by conventional scanning electron microscopy (SEM). Static light-scattering methods for determining the particle size distributions or particle diameters of matrix particles are unable, in contrast, to distinguish between aggregates or agglomerates.

The porous particles may have any desired morphology, and may therefore, for example, be platy, irregular-shaped, splinter-shaped, spherical or else acicular, with splinter-shaped or spherical particles being preferred.

The porous particles may have an average sphericity (as defined herein) of more than 0.5. Preferably they have an average sphericity of at least 0.55, or at least 0.6, or at least 0.65, or at least 0.7, or at least 0.75, or at least 0.8, or at least 0.85. Spherical particles are believed to aid uniformity of deposition and facilitate denser packing both in the batch pressure reactor and of the final product when incorporated into electrodes.

It is possible to obtain highly accurate two-dimensional projections of micron scale particles by scanning electron microscopy (SEM) or by dynamic image analysis, in which a digital camera is used to record the shadow projected by a particle. The term "sphericity" as used herein shall be understood as the ratio of the area of the particle projection (obtained from such imaging techniques) to the area of a circle, wherein the particle projection and circle have identical circumference. Thus, for an individual particle, the sphericity S may be defined as:

$$S = \frac{4 \cdot \pi \cdot A_m}{(C_m)^2}$$

wherein $A_m$ is the measured area of the particle projection and $C_m$ is the measured circumference of the particle projection. The average sphericity $S_{av}$ of a population of particles as used herein is defined as:

$$S_{av} = \frac{1}{n}\sum_{i=1}^{n}\left[\frac{4 \cdot \pi \cdot A_m}{(C_m)^2}\right]$$

wherein n represents the number of particles in the population. The average sphericity for a population of particles is preferably calculated from the two-dimensional projections of at least 50 particles.

The porous particles comprise a three-dimensionally interconnected open pore network comprising micropores and/or mesopores and optionally a minor volume of macropores. In accordance with conventional IUPAC terminology, the term "micropore" is used herein to refer to pores of less than 2 nm in diameter, the term "mesopore" is used herein to refer to pores of 2-50 nm in diameter, and the term "macropore" is used to refer to pores of greater than 50 nm diameter.

References herein to the volume of micropores, mesopores and macropores in the porous particles, and also any references to the distribution of pore volume within the porous particles, relate to the internal pore volume of the porous particles used as the starting material in step (a) of the claimed process, i.e. prior to deposition of silicon into the pore volume in step (c).

The porous particles are characterised by a total volume of micropores and mesopores (i.e. the total pore volume in the range from 0 to 50 nm) in the range from 0.4 to 2.2 cm³/g. Typically, the porous particles include both micropores and mesopores. However, it is not excluded that porous particles may be used which include micropores and no mesopores, or mesopores and no micropores.

More preferably, the total volume of micropores and mesopores in the porous particles is at least 0.45 cm³/g, or at least 0.5 cm³/g, at least 0.55 cm³/g, or at least 0.6 cm³/g, or at least 0.65 cm³/g, or at least 0.7 cm³/g, or at least 0.75 cm³/g, or at least 0.8 cm³/g, at least 0.85 cm³/g, or at least 0.9 cm³/g, or at least 0.95 cm³/g, or at least 1 cm³/g. The use of high porosity particles may be advantageous since it allows a larger amount of silicon to be accommodated within the pore structure.

The internal pore volume of the porous particles is suitably capped at a value at which increasing fragility of the porous particles outweighs the advantage of increased pore volume accommodating a larger amount of silicon. Preferably, the total volume of micropores and mesopores in the porous particles is no more than 2 cm³/g, or no more than 1.8 cm³/g, or no more than 1.6 cm³/g, or no more than 1.5 cm³/g, or no more than 1.45 cm³/g, or no more than 1.4 cm³/g, or no more than 1.35 cm³/g, or no more than 1.3 cm³/g, or no more than 1.25 cm³/g, or no more than 1.2 cm³/g.

In some examples, the total volume of micropores and mesopores in the porous particles may be in the range from 0.45 to 2.2 cm³/g, or from 0.5 to 2 cm³/g, or from 0.55 to 2 cm³/g, or from 0.6 to 1.8 cm³/g, or from 0.65 to 1.8 cm³/g, or from 0.7 to 1.6 cm³/g, or from 0.75 to 1.6 cm³/g, or from 0.8 to 1.5 cm³/g.

In other examples, the total volume of micropores and mesopores in the porous particles may be in the range from 0.4 to 0.75 cm³/g, or from 0.4 to 0.7 cm³/g, or from 0.4 to 0.65 cm³/g, 0.45 to 0.75 cm³/g, or from 0.45 to 0.7 cm³/g, or from 0.45 to 0.65 cm³/g, or from 0.45 to 0.6 cm³/g.

In other examples, the total volume of micropores and mesopores in the porous particles may be in the range from 0.6 to 2 cm³/g, or from 0.6 to 1.8 cm³/g, or from 0.7 to 1.8 cm³/g, or from 0.7 to 1.6 cm³/g, or from 0.8 to 1.6 cm³/g, or from 0.8 to 1.5 cm³/g, or from 0.8 to 1.4 cm³/g, or from 0.9 to 1.5 cm³/g, or from 0.9 to 1.4 cm³/g, or from 1 to 1.4 cm³/g.

The $PD_{50}$ pore diameter of the porous particles is preferably no more than 30 nm, and optionally no more than 25 nm, or no more than 20 nm, or no more than 15 nm, or no more than 12 nm, or no more than 10 nm, or no more than 8 nm, or no more than 6 nm, or no more than 5 nm, or no more than 4 nm, or no more than 3 nm, or no more than 2.5 nm, or no more than 2 nm, or no more than 1.5 nm. The term "$PD_{50}$ pore diameter" as used herein refers to the volume-based median pore diameter, based on the total volume of micropores and mesopores (i.e. the pore diameter below which 50% of the total micropore and mesopore volume is found). Therefore, in accordance with the invention, at least 50% of the total volume of micropores and mesopores is preferably in the form of pores having a diameter of less than 30 nm.

For the avoidance of doubt, any macropore volume (pore diameter greater than 50 nm) is not taken into account for the purpose of determining $PD_{50}$ values.

The volumetric ratio of micropores to mesopores in the porous particles may range in principle from 100:0 to 0:100. Preferably, the volumetric ratio of micropores to mesopores is from 90:10 to 55:45, or from 90:10 to 60:40, or from 85:15 to 65:35.

The pore size distribution of the porous particles may be monomodal, bimodal or multimodal. As used herein, the term "pore size distribution" relates to the distribution of pore size relative to the cumulative total internal pore volume of the porous particles. A bimodal or multimodal pore size distribution may be preferred since close proximity between micropores and pores of larger diameter provides the advantage of efficient ionic transport through the porous network to the silicon.

The total volume of micropores and mesopores and the pore size distribution of micropores and mesopores are determined using nitrogen gas adsorption at 77 K down to a relative pressure $p/p_0$ of $10^{-6}$ using quenched solid density functional theory (QSDFT) in accordance with standard methodology as set out in ISO 15901-2 and ISO 15901-3 or using classical adsorption models such as Horvath-Kawazoe model for micropores in accordance with DIN 66135 and BJH model for mesopores in accordance with DIN66134. Nitrogen gas adsorption is a technique that characterises the porosity and pore diameter distributions of a material by allowing a gas to condense in the pores of a solid. As pressure increases, the gas condenses first in the pores of smallest diameter and the pressure is increased until a saturation point is reached at which all of the pores are filled with liquid. The nitrogen gas pressure is then reduced incrementally, to allow the liquid to evaporate from the system. Analysis of the adsorption and desorption isotherms, and the hysteresis between them, allows the pore volume and pore size distribution to be determined. Suitable instruments for the measurement of pore volume and pore size distributions by nitrogen gas adsorption include the TriStar II and TriStar II Plus porosity analyzers, which are available from Micromeritics Instrument Corporation, USA, and the Autosorb IQ porosity analyzers, which are available from Quantachrome Instruments.

Nitrogen gas adsorption is effective for the measurement of pore volume and pore size distributions for pores having a diameter up to 50 nm, but is less reliable for pores of much larger diameter. For the purposes of the present invention, nitrogen adsorption is therefore used to determine pore volumes and pore size distributions only for pores having a diameter up to and including 50 nm (i.e. only for micropores and mesopores). $PD_{50}$ are likewise determined relative to the total volume of micropores and mesopores only.

In view of the limitations of available analytical techniques it is not possible to measure pore volumes and pore size distributions across the entire range of micropores, mesopores and macropores using a single technique. In the case that the porous particles comprise macropores, the volume of pores having diameter in the range from greater than 50 nm and up to 100 nm may be measured by mercury porosimetry and is preferably no more than 0.3 $cm^3$/g, or no more than 0.20 $cm^3$/g, or no more than 0.1 $cm^3$/g, or no more than 0.05 $cm^3$/g. A small fraction of macropores may be useful to facilitate electrolyte access into the pore network, but the advantages of the invention are obtained substantially by accommodating silicon in micropores and smaller mesopores.

Any pore volume measured by mercury porosimetry at pore sizes of 50 nm or below is disregarded (as set out above, nitrogen adsorption is used to characterize the mesopores and micropores). Pore volume measured by mercury porosimetry above 100 nm is assumed for the purposes of the invention to be inter-particle porosity and is also disregarded.

Mercury porosimetry is a technique that characterizes the porosity and pore diameter distributions of a material by applying varying levels of pressure to a sample of the material immersed in mercury. The pressure required to intrude mercury into the pores of the sample is inversely proportional to the size of the pores. Values obtained by mercury porosimetry as reported herein are obtained in accordance with ASTM UOP578-11, with the surface tension y taken to be 480 mN/m and the contact angle φ taken to be 140° for mercury at room temperature. The density of mercury is taken to be 13.5462 $g/cm^3$ at room temperature. A number of high precision mercury porosimetry instruments are commercially available, such as the AutoPore IV series of automated mercury porosimeters available from Micromeritics Instrument Corporation, USA. For a complete review of mercury porosimetry reference may be made to P. A. Webb and C. Orr in "Analytical Methods in Fine Particle Technology, 1997. Micromeritics Instrument Corporation, ISBN 0-9656783-0.

It will be appreciated that intrusion techniques such as gas adsorption and mercury porosimetry are effective only to determine the pore volume of pores that are accessible to nitrogen or to mercury from the exterior of the porous particles. Porosity values specified herein shall be understood as referring to the volume of open pores, i.e. pores that are accessible to a fluid from the exterior of the porous particles. Fully enclosed pores which cannot be identified by nitrogen adsorption or mercury porosimetry shall not be taken into account herein when determining porosity values. Likewise, any pore volume located in pores that are so small as to be below the limit of detection by nitrogen adsorption is not taken into account.

The porous particles preferably have a Gurwich gas-accessible pore volume of ≥0.2 $cm^3$/g, more preferably ≥0.6 $cm^3$/g and most preferably ≥1.0 $cm^3$/g. This is useful for obtaining lithium-ion batteries with a high capacity. The Gurwich gas-accessible pore volume was determined by gas absorption measurements with nitrogen in accordance with DIN 66134.

Preferred porous particles are those having a gas-inaccessible pore volume of less than 0.3 $cm^3$/g and more preferably less than 0.15 $cm^3$/g. In this way as well, it is possible to increase the capacity of the lithium-ion batteries. The gas-inaccessible pore volume may be determined by means of the following formula:

gas-inaccessible pore volume=1/pure-material density−1/skeletal density.

The pure-material density here is a theoretical density of the porous particles, based on the phase composition or the density of the pure material (the density of the material as if it had no closed porosity). Data on pure-material densities can be found by the skilled person in, for example, the Ceramic Data Portal of the National Institute of Standards (NIST, https://srdata.nist.gov/CeramicDataPortal/scd). For example, the pure-material density of carbon is 2.2 to 2.3 g/m³, that of silicon oxide is 2.203 g/cm³, that of boron nitride is 2.25 g cm³, that of silicon nitride is 3.44 g/cm, and that of silicon carbide is 3.21 g/cm³. The skeletal density is the actual density of the porous particles (gas-accessible) determined by helium pycnometry.

The porous particles are preferably based on one or more materials selected from the group comprising amorphous carbon in the form of hard carbon, soft carbon, mesocarbon microbeads, natural graphite or synthetic graphite, single-walled and multi-walled carbon nanotubes and graphene; oxides, such as silicon dioxide, aluminum oxide, mixed silicon-aluminum oxides, titanium oxides, magnesium oxide, lead oxides and zirconium oxide; carbides, such as silicon carbides and boron carbides; nitrides, such as silicon nitrides and boron nitrides; and other ceramic materials.

Examples of ceramic materials are described by the following component formula:

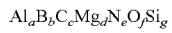

$Al_a B_b C_c Mg_d N_e O_f Si_g$ with $0 \leq a, b, c, d, e, f, g \leq 1$, with at least two coefficients a to g>0 and $a*3+b*3+c*4+d*2+g*4^3 e*3+f*2$.

The ceramic materials may for example be binary, ternary, quaternary, quinary, senary or septernary compounds. Preferred ceramic materials are those having the following component formulas:

nonstoichiometric boron nitrides $BN_z$ with z=0.2 to 1,
nonstoichiometric carbon nitrides $CN_z$ with z=0.1 to 4/3.
boron carbonitrides $B_x CN_z$ with x=0.1 to 20 and z=0.1 to 20, where $x*3+4^3 z*3$,
boron nitridoxides $BN_z O_r$ with z=0.1 to 1 and r=0.1 to 1, where $3^3 r*2+z*3$,
boron carbonitride oxides $B_x CN_z O_r$ with x=0.1 to 2, z=0.1 to 1 and r=0.1 to 1, where: $x*3+4^3 r*2+z*3$,
silicon carboxide $Si_x CO_z$ with x=0.1 to 2 and z=0.1 to 2, where $x*4+4^3*z*2$,
silicon carbonitrides $Si_x CN_z$ with x=0.1 to 3 and z=0.1 to 4, where $x*4+4^3 z*3$,
silicon borocarbonitrides $Si_w B_x CN_z$ with w=0.1 to 3, x=0.1 to 2 and z=0.1 to 4, where $w*4+x*3+4^3 z*3$.
silicon borocarboxides $Si_w B_x CO_z$ with w=0.10 to 3, x=0.1 to 2 and z=0.1 to 4, where $w*4+x*3+4^3 z*2$,
silicon borocarbonitridooxides $Si_v B_w CN_x O_z$ with v=0.1 to 3, w=0.1 to 2, x=0.1 to 4 and z=0.1 to 3, where $v*4+w*3+4*x*3+z*2$, and
aluminum borosilicocarbonitridooxides $Al_u B_v Si_x CN_w O_z$ with u=0.1 to 2, v=0.1 to 2, w=0.1 to 4, x=0.1 to 2 and z=0.1 to 3, where $u*3+v*3+x*4+4^3\ w*3+z*2$.

Examples of porous metal oxide particles are oxides of titanium having the formula $TiO_x$ where x has a value greater than 1 and less than 2.

Preferred porous particles are based on carbon, silicon dioxide, titanium oxides, boron nitride, silicon carbide and/or silicon nitride. More preferred materials are carbon, boron nitride and silicon dioxide.

The porous particles are more preferably porous conductive particles and most preferably porous carbon particles.

Porous carbon particles may be based on materials selected from the group comprising amorphous carbon, natural graphite or synthetic graphite, carbon nanotubes, such as single-wall and multiwall carbon nanotubes, and graphene. Amorphous carbon may be in the form of hard carbon, soft carbon or mesocarbon microbeads. The carbon may be crystalline carbon or amorphous carbon, or a mixture of amorphous and crystalline carbon. The porous carbon particles may be either hard carbon particles or soft carbon particles.

The porous carbon particles preferably comprise at least 80 wt % carbon, more preferably at least 90 wt % carbon, more preferably at least 95 wt % carbon, and optionally at least 98 wt % or at least 99 wt % carbon.

As used herein, the term "hard carbon" refers generally to a disordered carbon matrix in which carbon atoms are found predominantly in the $sp^2$ hybridised state (trigonal bonds) in nanoscale polyaromatic domains. The polyaromatic domains are generally cross-linked with a chemical bond. e.g. a C—O—C bond. Due to the chemical cross-linking between the polyaromatic domains, hard carbons cannot be converted to graphite at high temperatures. Hard carbons have generally graphite-like character as evidenced by the large G-band (~1600 cm$^{-1}$) in the Raman spectrum. However, the carbon is generally not fully graphitic as evidenced by the significant D-band (~1350 cm$^{-1}$) in the Raman spectrum.

As used herein, the term "soft carbon" also refers generally to a disordered carbon matrix in which carbon atoms are found predominantly in the $sp^2$ hybridised state (trigonal bonds) in polyaromatic domains having dimensions in the range from 5 to 200 nm. In contrast to hard carbons, the polyaromatic domains in soft carbons are generally associated by intermolecular forces but are not cross-linked with a chemical bond. This means that they will graphitise at high temperature. The porous carbon particles preferably comprise at least 50% $sp^2$ hybridised carbon as measured by XPS. For example, the porous carbon particles may suitably comprise from 50% to 98% $sp^2$ hybridised carbon, from 55% to 95% $sp^2$ hybridised carbon, from 60% to 90% $sp^2$ hybridised carbon, or from 70% to 85% $sp^2$ hybridised carbon.

A variety of different materials may be used to prepare suitable porous carbon frameworks. Examples of organic materials that may be used include plant biomass including lignocellulosic materials (such as coconut shells, rice husks, wood etc.) and fossil carbon sources such as coal. Examples of resins and polymeric materials which form porous carbon particles on pyrolysis include phenolic resins, novolac resins, pitch, melamines, polyacrylates, polystyrenes, polyvinylalcohol (PVA), polyvinylpyrrolidone (PVP), and various copolymers comprising monomer units of acrylates, styrenes, α-olefins, vinyl pyrrolidone and other ethylenically unsaturated monomers. A variety of different carbon materials are available in the art depending on the starting material and the conditions of the pyrolysis process. Porous carbon particles of various different specifications are available from commercial suppliers.

The porous carbon particles may undergo a chemical or gaseous activation process to increase the volume of mesopores and micropores. A suitable activation process comprises for instance contacting pyrolyzed carbon with one or more of oxygen, steam, CO, $CO_2$ or KOH at a temperature in the range from 600 to 1000° C.

The porous particles are preferably open-pore. Open-pore means generally that pores are connected to the surface of particles, via channels, for example, and can preferably be in mass transfer, especially in transfer of gaseous compounds, with the surroundings. This can be verified using gas absorption measurements (evaluation according to Brunauer, Emmett and Teller, "BET"), i.e., of the specific surface area.

The porous particles preferably have a BET surface area of at least 50 m²/g, or at least 750 m²/g, or at least 1,000 m²/g, or at least 1,250 m²/g, or at least 1,500 m²/g. The term "BET surface area" as used herein should be taken to refer to the surface area per unit mass calculated from a measurement of the physical adsorption of gas molecules on a solid surface, using the Brunauer-Emmett-Teller theory, in accordance with ISO 9277. Preferably, the BET surface area of the porous particles is no more than 4,000 m$^2$/g, or no more than 3,500 m$^2$/g, or no more than 3,250 m$^2$/g, or no more than 3,000 m$^2$/g. For example, the porous particles may have a BET surface area in the range from 750 m$^2$/g to 4.000 m$^2$/g, or from 1,000 m$^2$/g to 3,500 m$^2$/g, or from 1.250 m$^2$/g to 3,250 m$^2$/g, or from 1,500 m$^2$/g to 3,000 m$^2$/g.

The porous particles preferably possess a skeletal density, determined by helium pycnometry, of 0.1 to 7 g/cm$^3$ and more preferably of 0.3 to 3 g/cm$^3$. This is advantageous for increasing the gravimetric capacity (mAh/g) of lithium-ion batteries.

The porous particles preferably have a particle density of at least 0.35 and preferably less than 3 g/cm$^3$, more preferably less than 2 g/cm$^3$, more preferably less than 1.5 g/cm$^3$, most preferably from 0.35 to 1.2 g/cm$^3$. As used herein, the term "particle density" refers to "apparent particle density" as measured by mercury porosimetry (i.e. the mass of a particle divided by the particle volume wherein the particle volume is taken to be the sum of the volume of solid material and any closed or blind pores (a "blind pore" is pore that is too small to be measured by mercury porosimetry)).

Preferably, the porous particles have a particle density as measured by mercury porosimetry of at least 0.4 g/cm$^3$, or at least 0.45 g/cm$^3$, or at least 0.5 g/cm$^3$, or at least 0.55 g/cm$^3$, or at least 0.6 g/cm$^3$, or at least 0.65 g/cm$^3$, or at least 0.7 g/cm$^3$. Preferably, the porous particles have a particle density as measured by mercury porosimetry of no more than 1.15 g/cm$^3$, or no more than 1.1 g/cm$^3$, or no more than 1.05 g/cm$^3$, or no more than 1 g/cm$^3$, or no more than 0.95 g/cm$^3$, or no more than 0.9 g/cm$^3$.

For clarification it is noted that the porous particles are generally different from the silicon-containing composite particles. The porous particles act as starting material for producing silicon-containing composite particles. Generally there is no silicon, more particularly no silicon obtained by deposition of silicon precursors, located in the pores of the porous particles and on the surface of the porous particles, preferably.

The silicon-containing precursor is preferably a silicon-containing liquid or gas under standard conditions (100 kPa and 20° C.). Preferably, the silicon-containing precursor is a silicon-containing gas at standard conditions.

The silicon-containing precursor generally form silicon under thermal treatment. Silicon-containing precursors are preferably selected from the group comprising silicon-hydrogen compounds, chlorine-containing silanes and alkylsilanes.

Examples of silicon-hydrogen compounds are monosilane SiH$_4$, disilane Si$_2$H$_4$, trisilane (Si$_3$H$_8$) and higher linear, branched or cyclic homologs, such as neo-pentasilane Si$_5$H$_{12}$, cyclo-hexasilane Si$_6$H$_{12}$. Examples of chlorine-containing silanes are trichlorosilane HSiCl$_3$, dichlorosilane H$_2$SiCl$_2$, chlorosilane H$_3$SiCl, tetrachlorosilane SiCl$_4$, hexachlorodisilane Si$_2$Cl$_6$ and higher linear, branched or cyclic homologs, such as 1,1,2,2-tetrachlorodisilane Cl$_2$HSi—SiHCl$_2$, chlorinated or part-chlorinated oligosilanes or polysilanes, methylchlorosilanes, such as trichloromethylsilane MeSiCl$_3$, dichlorodimethylsilane Me$_2$SiCl$_2$, chlorotrimethylsilane Me$_3$SiCl, tetramethylsilane Me$_4$Si, dichloromethylsilane MeHSiCl$_2$, choromethylsilane MeH$_2$SiCl and chlorodimethylsilane Me$_2$HSiCl. Examples of alkylsilanes are methylsilane MeH$_3$Si, dimethylsilane Me$_2$H$_2$Si and trimethylsilane Me$_3$SiH.

More preferred silicon-containing precursors are selected from the group encompassing monosilane SiH$_4$; linear silanes of the general formula Si$_n$H$_{n+2}$, where n may comprise an integer in the 2 to 10 range; cyclic silanes of the general formula —[SiH$_2$]$_n$—, where n may comprise an integer in the 3 to 10 range; trichlorosilane HSiCl$_3$, dichlorosilane H$_2$SiCl$_2$, and chlorosilane H$_3$SiCl. Particularly preferred silicon-containing precursors include silane (SiH$_4$), disilane (Si$_2$H$_6$), trisilane (Si$_3$H$_8$), methylsilane, dimethylsilane and chlorosilanes, particularly. Even more preferred silicon-containing precursors are selected from the group encompassing SiH$_4$, HSiCl$_3$ and H$_2$SiCl$_2$. Most preferred is a silane (SiH$_4$).

The charge of porous particles used in step (b) has a volume of preferably at least 30 cm$^3$/L$_{RV}$, or at least 40 cm$^3$/L$_{RV}$, or at least 50 cm$^3$/L$_{RV}$, or at least 75 cm$^3$/L$_{RV}$, or at least 100 cm$^3$/L$_{RV}$, or at least 150 cm$^3$/L$_{RV}$, or at least 200 cm$^3$/L$_{RV}$ and more preferably at least 250 cm$^3$/L$_{RV}$, or at least 300 cm$^3$/L$_{RV}$, or at least 400 cm$^3$/L$_{RV}$, or at least 500 cm$^3$/L$_{RV}$, or at least 600 cm$^3$/L$_{RV}$, or at least 700 cm$^3$/L$_{RV}$, or at least 800 cm$^3$/L$_{RV}$, or at least 900 cm$^3$/L$_{RV}$. Preferably, the charge of porous particles used in step (b) is at least 500 cm$^3$/L$_{RV}$ and in some embodiments is optionally sufficient so as to substantially fill the reactor volume of the batch pressure reactor.

As used herein, the volume of the porous particles refers to the equivalent mass of the porous particles as determined from the tap density. For example, a particle volume of 200 cm$^3$ of a porous particle material having a tap density of 1000 g/L as defined herein is equivalent to 200 g of the porous particle material. Tap density is measured in accordance with ISO 3953 using 12,000 taps as standard.

The charge of sificon-containing precursor used in step (b) comprises at least 2 g/L$_{RV}$ of silicon and preferably at least 5 g/L$_{RV}$ of silicon, or at least 10 g/L$_{RV}$ of silicon, or at least 15 g/L$_{RV}$ of silicon, or at least 20 g/L$_{RV}$ of silicon, or at least 40 g/L$_{RV}$ of silicon, or at least 60 g/L$_{RV}$ of silicon, or at least 80 g/L$_{RV}$ of silicon, or at least 100 g/L$_{RV}$ of silicon, or at least 150 g/L$_{RV}$ of silicon, or at least 200 g/L$_{RV}$ of silicon, or at least 250 g/L$_{RV}$ of silicon.

Preferably, the silicon-containing precursor used in step (b) is gaseous. The partial pressure of the silicon-containing precursor in the batch pressure reactor following step (b) is preferably at least 200 kPa, or at least 300 kPa, or at least 500 kPa, or more preferably at least 700 kPa, or at least 1,000 kPa, or at least 1.500 kPa, or at least 2,000 kPa, or at least 2,500 kPa, or at least 3,000 kPa, or at least 4.000 kPa, or at least 5,000 kPa.

The batch pressure reactor preferably contains essentially no oxygen gas once the porous particle and silicon-containing precursor charges have been added. Oxygen can be sufficiently eliminated from the reactor by evacuating the reactor volume and flushing with an inert gas or with the silicon-containing precursor gas in accordance with standard procedures for reactions carried out oxygen-free atmospheres, for instance.

The batch pressure reactor may contain an inert padding gas in addition to the silicon-containing precursor; such as noble gases, like helium, neon, argon, krypton, xenon, or nitrogen, carbon dioxide or forming gas. Preferred inert gases include argon and particularly nitrogen.

The charge to the batch pressure reactor may also include hydrogen gas, particularly in the case that the silicon-containing precursor is a chlorosilane, preferably in at least a 1:1 atomic ratio of hydrogen to chlorine.

The batch pressure reactor may additionally be charged with one or more dopants. Dopants are based, for example, on compounds containing boron, nitrogen, phosphorus, arsenic, germanium, iron or nickel. The dopants are preferably selected from the group encompassing ammonia $NH_3$, diborane $B_2H_6$, phosphane $PH_3$, germane $GeH_4$, arsane $AsH_3$, and nickel tetracarbonyl $Ni(CO)_4$. Dopants may be charged into the batch pressure reactor in step (b) or in Phase 1 or Phase 2 of the instant process, for instance.

The batch pressure reactor may additionally be charged with one or more hydrocarbons selected from the group comprising aliphatic hydrocarbons having 1 to 10 carbon atoms, preferably 1 to 6 carbon atoms, such as methane, ethane, propane, butane, pentane, isobutane, hexane, cyclopropane, cyclobutane, cyclopentane, cyclohexane, cycloheptane; unsaturated hydrocarbons having 1 to 10 carbon atoms, such as ethene, acetylene, propene or butene, isoprene, butadiene, divinylbenzene, vinylacetylene, cyclohexadiene, cyclooctadiene, cyclic unsaturated hydrocarbons, such as cyclopropene, cyclobutene, cyclopentene, cyclohexene, cyclohexadiene, cyclopentadiene, dicyclopentadiene or norbornadiene: aromatic hydrocarbons, such as benzene, toluene, p-, m-, or o-xylene, styrene (vinylbenzene), ethylbenzene, diphenylmethane or naphthalene, other aromatic hydrocarbons, such as, for example, phenol, o-, m-, p-cresol, cymene, nitrobenzene, chlorobenzene, pyridine, anthracene or phenanthrene; myrcene, geraniol, thioterpineol, norbornane, borneol, isoborneol, bornane, camphor, limonene, terpinene, pinene, pinane, carene, phenol, aniline, anisole, furan, furfural, furfuryl alcohol, hydroxymethylfurfural, bishydroxymethylfuran, and mixed fractions comprising a multiplicity of such compounds, such as, for example, those from natural gas condensates, crude oil distillates or coking oven condensates, mixed fractions from the product streams from a fluid catalytic cracker (FCC), steam cracker or Fischer-Tropsch synthesis plant, or, very generally, hydrocarbon-containing material streams from the processing of wood, natural gas, crude oil, and coal. Hydrocarbons may be charged into the batch pressure reactor in step (b) or in Phase 1 or Phase 2 of the instant process, for instance.

Following step (b) the content of the batch pressure reactor may preferably consist essentially of the porous particles, the silicon precursor and optionally an inert padding gas or hydrogen.

The mass ratio of the porous particles to the silicon in the silicon-containing precursor defines generally the silicon content of the composite particle product. Preferably, the mass ratio of the porous particles to the silicon precursor (silicon equivalent basis) in step (b) is from 95:5 to 40:60, resulting in composite particles with a theoretical silicon content of from 5 to 60 wt %. For example, the mass ratio of the porous particles to the silicon precursor (silicon equivalent basis) in step (b) may be at least 90:10, or at least 85:15, or at least 80:20. Optionally, the mass ratio of the porous particles to the silicon precursor (silicon equivalent basis) in step (b) may be no more than 50:50, or no more than 60:40, or no more than 70:30.

The temperature in step (c) is preferably in the range from 300 to 800° C. or from 300 to 750° C., or from 300 to 700° C., or from 300 to 650° C., or from 300 to 600° C., or from 320 to 550° C., or from 320 to 500° C., or from 340 to 450° C., or from 350 to 450° C., or from 300 to 395° C., or from 320 to 380° C. In general, lower temperatures (e.g. from 320 to 500° C. or from 340 to 450° C., or from 350 to 450° C., or from 320 to 380° C.) are preferred since the reaction is not limited by mass transfer.

The pressure in the batch pressure reactor in step (c) is an autogenous pressure and will depend on the type of silicon-containing precursor used as well as the size of the porous particle charge and the presence of any inert padding gases. However, in all instances, the pressure in step (c) is above atmospheric pressure, and preferably significantly above atmospheric pressure. For example, the pressure in step (c) may be at least 200 kPa, or at least 300 kPa, or at least 500 kPa, or preferably at least 700 kPa, or at least 1,000 kPa, or at least 1,500 kPa, or at least 2,000 kPa, or at least 2,500 kPa, or at least 3,000 kPa, or at least 4,000 kPa, or at least 5,000 kPa. Step (c) may optionally be carried out above the critical pressure of the silicon precursor.

The deposition of silicon from silicon-containing precursors results generally in the elimination of by-product gases, and generally an increase in reactor pressure. For example, the deposition of silicon from silane gas ($SIH_4$) results generally in the elimination of two moles of hydrogen gas per mole of silane gas precursor. As a result, the partial pressure of the eliminated hydrogen is generally significantly higher than the partial pressure of the unreacted silane. In some cases, e.g. where the charge of the silicon-containing precursor to the reactor is small compared to the reactor volume, the pressure increase resulting from complete conversion of the silicon-containing precursor may fall within the pressure tolerance of the batch pressure reactor. The by-product gas may then be simply evacuated from the reactor following completion of the reaction.

In other cases, it may be necessary to control the pressure increase as the reaction proceeds, preferably such that the total pressure in the batch pressure reactor does not exceed the maximum design pressure of the batch pressure reactor. Preferably, the pressure reactor comprises an integrated hydrogen selective membrane, preferably for controlling the pressure increase as the reaction proceeds, even more preferably for preventing the maximum design pressure being exceeded. This allows the separation of the hydrogen gas by-product from unreacted silane (or disilane, trisilane, etc.) so that the hydrogen gas can be vented from the reactor.

Depending on the amount of silicon to be deposited in step (c), the process of the invention may be operated as a multi-pass process in which successive deposition steps are used in order to deposit the target amount of silicon. A mufti-pass process preferably comprises the additional steps of (d) evacuating by-product gases from the batch pressure reactor;

(e) adding a further charge of a silicon-containing precursor to the batch pressure reactor, wherein the further charge of the silicon-containing precursor gas comprises at least 2 g of silicon per litre of reactor volume ($g/L_{RV}$); and (f) heating the reactor to a temperature effective to cause further deposition of silicon in the pores of the porous particles.

Steps (d) to (f) may be repeated as many times as is necessary to deposit the target amount of silicon.

The preferred operating parameters for charging the reactor with the silicon-containing precursor in step (b) and the reaction in step (c) described above, also apply to the repetition of these steps in steps (e) and (f). Steps (e) and (f) may be carried out under the same conditions, or under different conditions, to steps (b) and (c).

Optionally, at least one step (f) may be carried out at a lower temperature and/or lower pressure than step (c). In the case, that step (f) is repeated, each instance of step (f) may be carried out at a lower temperature and/or lower pressure than the preceding silicon deposition step (i.e. step (c) or a preceding step (f)).

It is believed that higher temperatures and higher pressures favour faster deposition rates and capping of pores more quickly leading to lower surface areas. However, these conditions might also favour deposition of silicon onto external surfaces of the particle, which is detrimental due to SEI formation on exposed silicon. Therefore, being able to vary the rate and position of the silicon deposition is a great advantage. By having multiple charging steps at different temperatures and/or pressures the rate of silicon deposition in step (c) could be high to fill the majority of the pore structure followed by subsequent one or more steps (f) at lower pressure and or temperature to slow the deposition rate to control the capping rate and prevent silicon deposition onto the external surfaces of the particle. Step (d) may optionally include cooling of the batch pressure reactor to a temperature below 300° C., i.e. to a temperature that is too low for the silicon deposition to occur. This allows the reactor to re-equilibrate with the fresh charge of the silicon-containing precursor prior to being heated back to the reaction temperature. However, if the injection time of the fresh charge of the silicon-containing precursor is short, then the cooling step may not be necessary.

A range of different silicon loadings in the composite particles may be obtained using the process of the invention. For example, the amount of silicon in the composite particle product from step (c) or step (f) may suitably be in the range of from 5 to 60 wt % based on the total mass of the silicon and porous particle framework. Preferably, the amount of silicon in the composite particle product from step (c) or step (f) is from 10 to 60 wt %, or from 15 to 60 wt %, or from 20 to 60 wt %, or from 25 to 60 wt %, or from 30 to 60 wt %, or from 35 to 60 wt %, or from 40 to 60 wt %, or from 45 to 55 wt %.

The amount of silicon in the composite particles may be selected such that at least 25% and as much as 80% or more of the internal pore volume of the porous particles is occupied by silicon following step (c). For example, the silicon may occupy from 25% to 60%, or from 25% to 55%, or from 30% to 50%, or from 53 to 55%, or from 40 to 60%, or from 25% to 45%, or from 25% to 40% of the internal pore volume of the porous particles. Within these preferred ranges, the pore volume of the porous particles is effective to accommodate expansion of the silicon during charging and discharging, but avoids excess pore volume which does not contribute to the volumetric capacity of the particulate particles. However, the amount of silicon is also not so high as to impede effective lithiation due to inadequate metal-ion diffusion rates or due to inadequate expansion volume resulting in mechanical resistance to lithiation.

The amount of silicon in the porous particles can be correlated to the available pore volume by the requirement that the mass ratio of silicon to the porous particles is in the range from $[0.5 \times P^1$ to $1.9 \times P_1]:1$, wherein $P_1$ is a dimensionless quantity having the magnitude of the total pore volume of micropores and mesopores in the porous particles, as expressed in cm$^3$/g (e.g. if the porous particles have a total volume of micropores and mesopores of 1.2 cm$^3$/g, then $P_1$=1.2).

This relationship takes into account the density of silicon and the pore volume of the porous particles to define a weight ratio of silicon at which the pore volume is around 20% to 82% occupied.

Preferably at least 90 wt %, more preferably at least 95 wt %, even more preferably at least 98 wt % of the silicon mass in the composite particles is located within the internal pore volume of the porous particles such that there is no or very little silicon located on the external surfaces of the composite particles. The reaction kinetics of the CVI process ensure that preferential deposition of silicon occurs on internal surfaces of the porous particles.

The composite particles can be further characterised by their performance under thermogravimetric analysis (TGA) in air. This method of analysis relies on the principle that a weight gain is observed when silicon is oxidized to silicon dioxide (SiO$_2$) in air and at elevated temperature. The mechanisms by which silicon oxidizes are dependent on temperature. Silicon atoms at the surface of a silicon nanostructure are oxidized at a lower temperature than silicon atoms in the bulk of a silicon nanostructure (reference: Bardet et al., *Phys. Chem. Chem. Phys.* (2016), 18, 18201).

The composite particles of the invention preferably have a low content of coarse bulk silicon as determined by TGA. Coarse bulk silicon is defined herein as silicon which undergoes oxidation above 800° C. as determined by TGA, wherein the TGA is carried out in air with a temperature ramp rate of 10° C./min. The coarse bulk silicon content is therefore determined according to the following formula:

$$Z = 1.875 \times [(M_f - M_{800})/M_f] \times 100\%$$

Wherein Z is the percentage of unoxidized silicon at 800° C., $M_{800}$ is the mass of the sample at 800° C., and $M_f$ is the mass of ash at completion of oxidation at 1400° C. For the purposes of this analysis, it is assumed that any mass increase above 800° C. corresponds to the oxidation of silicon to SiO$_2$ and that the total mass at completion of oxidation is SiO$_2$.

Silicon that undergoes oxidation above 800° C. is less desirable. Preferably, no more than 10 wt % of the silicon, or no more than 8 wt % of the silicon, or no more than 6 wt % of the silicon, or no more than 5 wt % of the silicon, or no more than 3 wt % of the silicon, or no more than 2 wt % of the silicon is coarse bulk silicon as determined by TGA.

The amount of silicon in the composite particles can be determined by elemental analysis. Preferably, elemental analysis is used to determine the weight percentage of carbon (and optionally hydrogen, nitrogen and oxygen) in the porous carbon particles alone and in the silicon-containing composite particles. Determining the weight percentage of carbon in the in the porous carbon particles alone takes account of the possibility that the porous carbon particles contain a minor amount of heteroatom. Both measurements taken together allow the weight percentage of silicon relative to the porous carbon particles to be determined reliably.

The silicon content is preferably determined by ICP-OES (inductively coupled plasma-optical emission spectrometry). A number of ICP-OES instruments are commercially available, such as the iCAP® 7000 series of ICP-OES analysers available from ThermoFisher Scientific. The carbon content of the composite particles and of the porous carbon particles alone (as well as the hydrogen, nitrogen and oxygen content if required) are preferably determined by IR absorption. A suitable instrument for determining carbon, hydrogen, nitrogen and oxygen content is the TruSpec Micro elemental analyser available from Leco Corporation.

The composite particles preferably have a low total oxygen content. Oxygen may be present in the composite particles for instance as part of the porous particles or as an oxide layer on any exposed silicon surfaces. Preferably, the total oxygen content of the composite particles is less than 15 wt %, more preferably less than 10 wt %, more preferably less than 5 wt %, for example less than 2 wt %, or less than 1 wt %, or less than 0.5 wt %.

The silicon-containing composite particles preferably have a $D_{50}$ particle diameter in the range of 0.5 to 30 μm. Where the $D_{50}$ particle diameter of the composite particles at the end of the CVI process is more than 30 μm, the composite particles are preferably reduced in size, e.g. by milling, prior to their use in manufacturing electrodes to a $D_{50}$ particle diameter of no more than 30 μm. Composite particles with a $D_{50}$ particle diameter that is no more than 30 μm have good dispersibility in slurries, structural robustness, high capacity retention over repeated charge-discharge cycles, and are suitable for forming dense electrode layers of uniform thickness in the conventional thickness range from 20 to 50 μm.

Optionally, the $D_{50}$ particle diameter of the silicon-containing composite particles may be at least 1 μm, or at least 2 μm, or at least 3 μm, or at least 4 μm, or at least 5 μm. Optionally the $D_{50}$ particle diameter may be no more than 20 μm, or no more than 18 μm, or no more than 16 μm, or no more than 14 μm, or no more than 12 μm, or no more than 10 μm, or no more than 8 μm.

For instance, the silicon-containing composite particles may have a $D_{50}$ particle diameter in the range from 1 to 20 μm, or from 1 to 18 μm, or from 1 to 16 μm, or from 2 to 16 μm, or from 2 to 14 μm, or from 2 to 12 μm, or from 2 to 10 μm, or from 2 to 8 μm.

The $D_{10}$ particle diameter of the silicon-containing composite particles is preferably at least 0.5 μm, or at least 0.8 μm, or at least 1 μm. By maintaining the $D_{10}$ particle diameter at 0.5 μm or more, the potential for undesirable agglomeration of sub-micron sized particles is reduced, resulting in improved dispersibility of the particulate material and improved capacity retention.

The $D_{90}$ particle diameter of the silicon-containing composite particles is preferably no more than 50 μm, or no more than 40 μm, or no more than 30 μm, or no more than 25 μm, or no more than 20 μm, or no more than 15 μm. The presence of very large particles results in non-uniform forming packing of the particles in electrode active layers, thus disrupting the formation of dense electrode layers, particularly electrode layers having a thickness in the range from 20 to 50 μm. Therefore, it is preferred that the $D_{90}$ particle diameter is up to 40 μm, and more preferably lower still.

The silicon-containing composite particles preferably have a narrow size distribution span. For instance, the particle size distribution span (defined as $(D_{90}-D_{10})/D_{50}$) is preferably 5 or less, more preferably 4 or less, more preferably 3 or less, more preferably 2 or less, and most preferably 1.5 or less. By maintaining a narrow size distribution span, efficient packing of the particles into dense electrode layers is more readily achievable.

The silicon-containing composite particles preferably have a BET surface area of no more than 300 $m^2/g$, or no more than 250 $m^2/g$, or no more than 200 $m^2/g$, or no more than 150 $m^2/g$, or no more than 100 $m^2/g$, or no more than 80 $m^2/g$, or no more than 60 $m^2/g$, or no more than 40 $m^2/g$, or no more than 30 $m^2/g$, or no more than 25 $m^2/g$, or no more than 20 $m^2/g$, or no more than 15 $m^2/g$, or no more than 10 $m^2/g$, or no more than 5 $m^2/g$. In general, a low BET surface area is preferred in order to minimize the formation of solid electrolyte interphase (SEI) layers at the surface of the composite particles during the first charge-discharge cycle of an anode. However, a BET surface area which is excessively low results in unacceptably low charging rate and capacity due to the inaccessibility of the bulk of the electroactive material to metal ions in the surrounding electrolyte. For instance, the BET surface area is preferably at least 0.1 $m^2/g$, or at least 1 $m^2/g$, or at least 2 $m^2/g$, or at least 5 $m^2/g$. For instance, the BET surface area may be in the range from 1 $m^2/g$ to 25 $m^2/g$, more preferably in the range from 2 to 15 $m^2/g$.

The silicon-containing composite particles preferably have a specific charge capacity on first lithiation of 1200 to 2340 mAh/g. Preferably the silicon-containing composite particles have a specific charge capacity on first lithiation of at least 1400 mAh/g.

The process of the reaction may be carried out using any reactor that is capable of operating in batch mode and at elevated pressures. A batch pressure reactor is, generally, a batch reactor which can be operated in a manner such that the pressure inside the reactor is greater than the surrounding pressure of the reactor.

The batch pressure reactor is preferably a type of reactor selected from the group comprising tubular reactors, fluidized bed reactors, fixed bed reactors, and autoclaves. Particularly preferred are fluidized bed reactors and autoclaves, especially autoclaves.

The porous particles and the forming composite particles may be present in the reactor in the form of a static bed of particles, or in the form of a moving bed of particles. A static bed of particles is preferred when the volume of the charge of porous particles is high relative to the usable volume of the batch pressure reactor, e.g. at least 80%, at least 90% or at least 95% of the usable volume of the batch pressure reactor (i.e. such that the reactor is essentially filled with the porous particles in step (b). The silicon-containing precursor can then be distributed throughout the entire volume of the porous particles before the reaction is started. Mass transfer limitations are therefore removed as the silicon-containing precursor is already present within the pores at the start of the reaction. The reaction takes place at any position in the reactor to the same degree of conversion so long as there are no temperature profiles in the reactor.

Batch pressure reactors which may be used for a static bed without commixing may have any desired geometry. Preferred forms of reactor construction are cylindrical, conical, spherical and polyhedral forms or combinations thereof.

A preferred reactor for a static bed reaction is a shell and tube furnace type reactor. This type of reactor comprises a plurality of reactor tubes (e.g. from 10 to 500 tubes) arranged in a pressure vessel shell. The tubes typically have a diameter of 5 to 200 mm so as to minimise any temperature profile during the CVI reaction. The tubes are hermetically sealed from the shell to create two separate cavities in the reactor. The tube-side cavity constitutes the reactor volume and contains the porous particles and the silicon-containing precursor during the CVI reaction. The shell-side cavity may contain a heat transfer fluid to heat or cool the contents of the tubes. Alternatively, the tubes may be heated by convection or conduction using resistive heating elements.

The porous particles can be loaded into the tubes for instance by suction through a porous plate disposed at one end of the tube. The tube side cavity may then be sealed, evacuated using vacuum and purged with inert gas, prior to the introduction of the specified amount of the silicon-containing precursor. The tube-side cavity may comprise a hydrogen selective membrane element to facilitate removal of the hydrogen by-product and control of the internal pressure.

In the case that the volume of the charge of porous particles is less than the reactor volume of the batch pressure reactor, then the porous particles are preferably in the form of a moving bed to maintain homogeneity in the reactor.

A suitable reactor for a moving bed reaction includes an autoclave reactor comprising an internal stirrer. The autoclave may be heated internally via a plurality of heating rods or a tube-type heat exchanger. Alternatively, the external walls of the autoclave may be heated by resistive heating elements or by convective heating. The autoclave reactor may be provided with a hydrogen selective membrane element to facilitate removal of the hydrogen by-product and control of the internal pressure. Other ways of maintaining of moving bed of particles during the CVI reaction include vibration, sonication and fluidisation techniques. Suitable reactors for a moving bed reaction include the stirred pressure reactor systems from the Parr Instrument Company® and the Novoclave® stirred autoclaves from Büchi AG®.

A moving bed batch pressure reactor may have any form of reactor construction in which beds of solids can be agitated. These are, for example, moving reactors, reactors with moving stirring elements, or gas-traversed reactors, or combinations thereof.

The form of movement in moving bed reactors is preferably a rotational movement. Other forms of movement are likewise suitable. Preferred forms of construction for rotating reactors are, for example, drum reactors or tubular reactors, conical reactors, double-cone reactors, reactors with offset cones, spherical reactors, polyhedral reactors, V-shaped reactors, double-V-shaped reactors, or geometric combinations thereof. In the case of symmetrical forms of construction, the axis of rotation lies preferably in the axis of symmetry of the reactor. In the case of nonsymmetric forms of construction, the axis of rotation passes preferably through the center of gravity of the reactor. In another preferred embodiment, the axis of rotation is selected such that a tumbling movement is developed. The mixing events within the moving bed reactor are preferably boosted by internals. Typical internals are guide plates, blades, vanes, and ploughshares. In accordance with the invention, the orientation of the axis of rotation is freely selectable here. Axes of rotation are preferably oriented vertically, horizontally or at a free angle in relation to the horizontal embodiment.

A further preferred form of construction for the moving bed is a fixed batch pressure reactor with moving stirring elements. Preferred geometries for this are cylindrical reactors, conical reactors, spherical reactors, polyhedral reactors, or combinations thereof. The movement of the stirring element is preferably a rotational movement. Other forms of movement are likewise suitable. The stirring element is driven preferably via a stirring shaft, and there may be one stirring element or a plurality of stirring elements present per stirring shaft. Incorporated in the batch pressure reactor are preferably a plurality of stirring shafts, on each of which there may be one stirring element or a plurality of stirring elements. The main reactor axis is preferably aligned horizontally or vertically. In a further preferred embodiment, the stirring shafts are installed horizontally or vertically in a reactor of arbitrary orientation. For batch pressure reactors operated vertically, preferred forms of construction are those in which, for example, a stirring element or plurality of stirring elements commix the bed material through a rotational movement by way of a main stirring shaft. Preference is given additionally to forms of construction in which two or more stirring shafts run in parallel. There are also preferred forms of construction in which two or more stirring shafts are operated not parallel to one another. Another preferred form of construction for a vertically operated batch pressure reactor is characterized by the use of a screw conveyor. The screw conveyor conveys the bed material preferably centrally. A further design in accordance with the invention is the screw conveyor rotating along at the edge of the reactor. For batch pressure reactors operated horizontally, preferred forms of construction are those in which, for example, a stirring element or plurality of stirring elements commix the bed material by a rotational movement by way of a main stirring shaft. Also possible are forms of construction wherein two or more stirring shafts run in parallel. Additionally preferred are forms of construction in which two or more stirring shafts are not operated in parallel to one another. For vertically operated batch pressure reactors, preferred stirring elements are elements selected from the group containing helical stirrers, spiral stirrers, anchor stirrers or, generally, stirring elements which convey the bed material axially or radially, or both axially and radially. In the case of horizontally operated batch pressure reactors, there are preferably a plurality of stirring elements on one shaft. Forms of construction in accordance with the invention for the stirring elements of horizontally operated reactors are ploughshare, paddle, blade stirrer, spiral stirrer or, generally, stirring elements which convey the bed material both axially and radially. Besides the moving stirring elements, preference is also given, for the fixed batch pressure reactor with moving stirring elements, to rigid internals, such as guide plates. Also preferred, in particular, are forms of construction in which both the reactor and a stirring element rotate.

As a further possibility for the commixing, beds of material are subjected preferably to gas streams. Particularly preferred here are forms of construction such as fluidized bed reactors. Further preferred are batch pressure reactors in which mixing zones are deliberately brought about in the reactor through the use of pneumatics.

For the construction of a batch pressure reactor, any material is in principle suitable if under the respective operating conditions it has the necessary mechanical strength and chemical resistance. In terms of the chemical resistance, the batch pressure reactor may consist of corresponding solid materials as well as of chemically unreactive materials (pressure-bearing) which have specific coatings or platings on parts that are in media contact. These materials are selected preferably from the group comprising:

metallic materials which correspond (according to DIN CEN ISO/TR 15608) for steels to material groups 1 to 11, for nickel and nickel alloys to groups 31 to 38, for titanium and titanium alloys to groups 51 to 54, for zirconium and zirconium alloys to groups 61 and 62, and for cast iron to groups 71 to 76, ceramic materials comprising oxide ceramics in a single-substance system, such as, for example, aluminum oxide, magnesium oxide, zirconium oxide, titanium dioxide (capacitor material), and also multi-substance systems, such as, for example, aluminum titanate (mixed form of aluminum oxide and titanium oxide), mullite (mixed form of aluminum oxide and silicon oxide), lead zirconate titanate (piezoceramic), or dispersion ceramics such as aluminum oxide strengthened with zirconium oxide (ZTA—zirconia toughened aluminum oxide)—$Al_2O_3/ZrO_2$), non-oxide ceramics, such as, for example carbides, examples being silicon carbide and boron carbide, nitrides, examples being silicon nitride, aluminum nitride, boron nitride and titanium nitride, borides and silicides, and also mixtures thereof, and composite materials belonging to the groups of the particulate composite materials, such as, for example, cemented carbide, ceramic composites, concrete and polymer concrete, the fiber composite materials, such as, for example, glass fiber-reinforced glass, metal matrix composites (MMC), fiber cement, carbon fiber-reinforced silicon carbide, self-reinforced thermoplastics, steel-reinforced concrete, fiber-reinforced concrete, fiber-plastics composites, such as, for example, carbon fiber-reinforced plastic (CRP), glass fiber-reinforced plastic (GRP) and aramid fiber-reinforced plastic (ARP), fiber-ceramic composites (ceramics matrix composites (CMC)), the penetration composite materials, such as, for example, metal-matrix composites (MMC), dispersion-strengthened aluminum alloys or dispersion-hardened nickel-chromium superalloys, the layered composite materials, such as, for example, bimetals, titanium-graphite composite, composite plates and composite tubes, glass fiber-reinforced aluminum and sandwich constructions, and the structural composite materials.

The surfaces of electroactive materials deposited by CVI are generally reactive to oxygen and generally form a native oxide layer when exposed to atmospheric oxygen. In the case of silicon, an amorphous silicon dioxide film is generally formed immediately when a silicon surface is exposed to oxygen. The formation of the native oxide layer is generally exothermic and therefore requires careful process control to prevent overheating or even combustion of the particulate material during manufacture. The presence of a native oxide layer is generally associated with irreversible capacity loss and reduced cycle life, and so may be deleterious to the performance of the electroactive materials in lithium-ion batteries. Therefore, the process of the invention may optionally comprise the step (g) of contacting the surface of the deposited silicon with a passivating agent, wherein the silicon is not exposed to oxygen prior to contact with the passivating agent.

Step (g) is carried out preferably immediately after the final silicon deposition step (i.e. step (c) in the case of a single deposition step, or after the final step (f) in a multi-pass deposition process.

A passivating agent is defined herein as a compound that is capable of modifying the surface of the electroactive material in such a way as to inhibit or prevent the formation of surface oxides.

Suitable passivating agents include, for example, compounds comprising an alkene, alkyne or carbonyl functional group, more preferably a terminal alkene, terminal alkyne or aldehyde group.

Preferred passivating agents include one or more compounds of the formulae:
(i) R—CH=CH—R;
(ii) R—C≡C—R;
(iii) O=CH—R; and
wherein R represents H or an unsubstituted or substituted aliphatic or aromatic hydrocarbyl group having from 1 to 20 carbon atoms, preferably from 2 to 10 carbon atoms, or wherein two R groups in formula (i) form an unsubstituted or substituted hydrocarbyl ring structure comprising from 3 to 8 carbon atoms.

Particularly preferred passivating agents include one or more compounds of the formulae:
(i) CH2=CH—R; and
(ii) HC≡C—R;
wherein R is as defined above. Preferably, R is unsubstituted.

Examples of suitable compounds include ethylene, propylene, 1-butene, butadiene, 1-pentene, 1,4-pentadiene, 1-hexene, 1-octene, styrene, divinylbenzene, acetylene, phenylacetylene, norbornene, norbornadiene and bicyclo[2.2.2]oct-2-ene. Mixtures of different passivating agents may also be used.

It is understood that the alkene, alkyne or carbonyl group of the passivating agent undergoes generally an insertion reaction with M-H groups at the surface of the electroactive material (where M represents an atom of the electroactive material) to form a covalently passivated surface which is resistant to oxidation by air. When silicon is the electroactive material, the passivation reaction between the silicon surface and the passivating agent may be understood as a form of hydrosilylation, as shown schematically below.

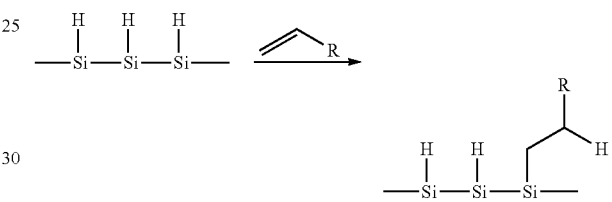

Other suitable passivating agents include compounds including an active hydrogen atom bonded to oxygen, nitrogen, sulphur or phosphorus. For example, the passivating agent may be an alcohol, amine, thiol or phosphine. Reaction of the group —XH with hydride groups at the surface of the electroactive material is understood to result in elimination of $H_2$ and the formation of a direct bond between X and the electroactive material surface.

Suitable passivating agents in this category include, for example, compounds of the formula

HX—R, (iv)

wherein X represents O, S, NR or PR, and wherein each R is independently as defined above.

Two R groups in formula (iv) may also form an unsubstituted or substituted hydrocarbyl ring structure comprising from 3 to 8 carbon atoms. Preferably X represents O or NH and R represents an optionally substituted aliphatic or aromatic group having from 2 to 10 carbon atoms. Amine groups may also be incorporated into a 4-10 membered aliphatic or aromatic ring structure, as in pyrrolidine, pyrrole, imidazole, piperazine, indole, or purine.

Contacting of the electroactive material with the passivating agent in step (g) may be carried out at a temperature in the range of 25 to 800° C., preferably no more than 750° C., or no more than 700° C., and at pressures in the range from 100 kPa to 50 MPa. For example, step (g) may suitably be carried out within the preferred temperature and pressure ranges for step (c) and/or step (f) as set out herein.

The passivation in step (g) may optionally be carried out in the same batch pressure reactor as steps (c) and/or (f), for example by cooling the batch pressure reactor to a suitable temperature and evacuating by-product gases from the batch pressure reactor; adding a charge of a passivating agent to the batch pressure reactor; and allowing the passivating agent to passivate the exposed silicon surfaces of the composite particles.

The process of the invention may further comprise a step of depositing a lithium ion permeable material into the remaining exposed pores and/or onto the outer surface of the composite particles after a final deposition from step (c), step (f) or step (g). This provides a further improvement in the performance of the composite particles when used as an electroactive material for lithium-ion batteries, by reducing the surface area of the composite particles and by sealing the nanoscale electroactive material domains away from electrolyte access.

Suitable lithium ion permeable materials include, for example, conductive pyrolytic carbon materials. A conductive pyrolytic carbon material in the pores and/or on the outer surface of the composite particles is advantageous since it improves electronic transport into and out of the bulk of the composite particles. This helps to improve the rate performance of the composite particles.

A pyrolytic carbon may be deposited by a chemical vapour deposition (CVD) method, i.e. by thermal decomposition of a volatile carbon-containing gas (e.g. ethylene) onto the surface of the silicon-containing composite particles.

A suitable process comprises, for example, the following steps:
(h) combining the composite particles from step (c), step (f) or step (g) with a pyrolytic carbon precursor; and
(i) heating the pyrolytic carbon precursor to a temperature effective to cause the deposition of a pyrolytic conductive carbon material into the pores and/or onto the outer surface of the composite particles.

Step (h) is suitably carried out at a temperature in the range from 300 to 800° C., or from 400 to 700° C. For example, the temperature in step (i) may be no more than 680° C. or no more than 660° C., or no more than 640° C. or no more than 620° C., or no more than 600° C. or no more than 580° C., or no more than 560° C., or no more than 540° C., or no more than 520° C., or no more than 500° C. The minimum temperature in step (i) will depend on the type of carbon precursor that is used. Preferably, the temperature in step (i) is at least 300° C., or at least 350° C., or at least 400° C., or at least 450° C., or at least 500° C. The pressure in step (i) may be in the range from 100 kPa to 50 MPa.

Suitably examples for pyrolytic carbon precursors comprise the hydrocarbons described above.

Further examples for suitable hydrocarbons include polycyclic hydrocarbons comprising from 10 to 25 carbon atoms and optionally from 1 to 3 heteroatoms, optionally wherein the polyaromatic hydrocarbon is selected from naphthalene, substituted naphthalenes such as di-hydroxynaphthalene, anthracene, tetracene, pentacene, fluorene, acenapthene, phenanthrene, fluoranthrene, pyrene, chrysene, perylene, coronene, fluorenone, anthraquinone, anthrone and alkyl-substituted derivatives thereof. Suitable pyrolytic carbon precursors also include bicyclic monoterpenoids, optionally wherein the bicyclic monoterpenoid is selected from camphor, borneol, eucalyptol, camphene, careen, sabinene, thujene and pinene. Further suitable pyrolytic carbon precursors include C2-C10 hydrocarbons, optionally wherein the hydrocarbons are selected from alkanes, alkenes, alkynes, cycloalkanes, cycloalkenes, and arenes, for example methane, ethylene, propylene, limonene, styrene, cyclohexane, cyclohexene, α-terpinene and acetylene. Other suitable pyrolytic carbon precursors include phthalocyanine, sucrose, starches, graphene oxide, reduced graphene oxide, pyrenes, perhydropyrene, triphenylene, tetracene, benzopyrene, perylenes, coronene, and chrysene. A preferred carbon precursor is acetylene.

The pyrolytic carbon precursors used in step (i) may be used in pure form, or diluted mixture with an inert carrier gas, such as nitrogen or argon. For instance, the pyrolytic carbon precursor may be used in an amount in the range from 0.1 to 100 vol %, or 0.5 to 20 vol %, or 1 to 10 vol %, or 1 to 5 vol % based on the total volume of the precursor and the inert carrier gas. The presence of oxygen should again be minimised to prevent undesired oxidation of the deposited electroactive material. Preferably, the oxygen content is less than 0.01 vol %, more preferably less than 0.001 vol % based on the total volume of gas used in step (i).

The deposition of the conductive carbon by CVD may optionally be carried out in the same batch pressure reactor as step (c) and/or step (f), for example by cooling the batch pressure reactor to a suitable temperature and evacuating by-product gases from the batch pressure reactor; adding a charge of a carbon-containing precursor to the batch pressure reactor; and heating the reactor to a temperature effective to cause deposition of a pyrolytic conductive carbon material into the pores and/or onto the outer surface of the composite particles.

Alternatively, the deposition of the conductive carbon by CVD may be carried out in another conventional reactor type (e.g. a fluidised bed reactor, or rotary kiln reactor) under a flow of gas comprising the carbon-containing precursor. Alternatively, the carbon coating may be formed by depositing a solution of a carbon-containing compound onto the surface of the composite particles followed by pyrolysis.

A carbon coating has the advantages that it further reduces the BET surface area of the composite particles by smoothing any surface defects and by filling any remaining surface microporosity, thereby further reducing first cycle loss. In addition, a carbon coating improves the conductivity of the surface of the composite particles, reducing the need for conductive additives in the electrode composition, and also creates an optimum surface for the formation of a stable SEI layer, resulting in improved capacity retention on cycling.

A reduction in the surface area of the composite particles also has the effect of reducing the amount of binder that is needed to form an electrode active layer comprising the composite particles. Excess binder is known to contribute to a reduction in rate performance.

When a carbon coating is present, the silicon-containing composite particles preferably have a BET surface area of no more than 150 m$^2$/g, or no more than 100 m$^2$/g, or no more than 80 mg, or no more than 60 m$^2$/g, or no more than 40 m$^2$/g, or no more than 30 m$^2$/g, or no more than 25 m$^2$/g, or no more than 20 m$^2$/g, or no more than 15 m$^2$/g, or no more than 10 m$^1$/g, or no more than 5 m$^2$/g, or no more than 3 m$^2$/g.

In the case that the lithium-ion permeable filler material is a conductive pyrolytic carbon material, the same compound may function as both the passivating agent in step (g) and the pyrolytic carbon precursor in step (h). For example, if styrene is selected as the pyrolytic carbon precursor, then it will also function as a passivating agent if the silicon is not exposed to oxygen prior to contact with styrene. In this case, passivation in step (g) and deposition of the conductive carbon material in steps (h) and (i) may be carried out simultaneously, for example at a temperature in the range of from 300-800° C. Alternatively, passivation in step (g) and deposition of the conductive carbon material in steps (h) and (i) may be carried out sequentially, with the same material as the passivating agent and the pyrolytic carbon precursor, but wherein step (i) is carried out at a higher temperature than step (g). For example, step (g) may be carried out at a temperature in the range of from 25° C. to less than 300° C., and step (i) may be carried out at a temperature in the range from 300-800° C.

Alternatively, different compounds may be used as the passivating agent in step (g) and as the pyrolytic carbon precursor in step (h). For example, the electroactive material may first be contacted with a passivating agent in step (g), followed by deposition of a conductive pyrolytic carbon material in steps (h) and (i), wherein the pyrolytic carbon precursor used in step (h) is different from the passivating agent used in step (g). For example, the passivating agent in step (g) could be styrene, and the pyrolytic carbon precursor in step (h) could be a compound such as cyclohexane which is capable of forming a pyrolytic carbon material but is not capable of passivating the electroactive material surface.

In the following, some preferred embodiments of the Phases 1 to 7 of the instant processes are described with more details. Just for clarification, the above described general or preferred embodiments of the instant process, such as the starting material, like porous particles, silicon-containing precursors, dopants or hydrocarbons, or reaction conditions, like temperature, pressure or inert gas padding, or embodiments of the batch pressure reactor or execution of the process, refer to the following Phases 1 to 7 as well and are disclosed in combination with the description of the following Phases 1 to 7.

In Phase 1, a batch pressure reactor is filled with porous particles. After that, the batch pressure reactor is generally closed.

The filling of the batch pressure reactor with porous particles may be carried out, for example, under an inert gas atmosphere or, preferably ambient air. Inert gas may be selected from the group comprising hydrogen; noble gases, such as helium, neon, argon, krypton, xenon; nitrogen; carbon dioxide or forming gas or mixtures thereof. Argon or, in particular, nitrogen is preferred.

In Phase 2, the batch pressure reactor is charged with one or more silicon-containing precursors.

In Phase 2, first of all, namely in particular before the batch pressure reactor is charged silicon-containing precursors, the batch pressure reactor is charged with inert gas or evacuated, with evacuation being particularly preferred. Examples and preferred embodiments of inert gas were described above for Phase 1. With particular preference, operation takes place without inert gas.

The batch pressure reactor is preferably charged with an amount of silicon-containing precursors such that, in relation to the amount of porous particles weighed in, an amount of silicon sufficient for the target capacity of the silicon-containing composite particles being produced is deposited.

Charging in this context means generally the introduction of the silicon-containing precursors into the batch pressure reactor. During introduction into the batch pressure reactor, the silicon-containing precursors may be present for example in gaseous, liquid or sublimable solid form. Thereafter the batch pressure reactor is generally dosed in a gastight manner.

The batch pressure reactor is charged in Phase 2 with one or more silicon-containing precursors and optionally with one or more further constituents, such as one or more inert gases, hydrogen, one or more dopants or one or more hydrocarbons. The silicon-containing precursors may generally be introduced as a mixture or separately, or as a mixture with inert gas, or as pure substances, into the batch pressure reactor. The partial pressure of the inert gas is preferably 0 to 99%, more preferably at most 50%, especially preferably at most 30%, and very preferably at most 5%, based on overall pressure of the silicon-containing precursors under standard conditions (according to DIN 1343). In one particularly preferred embodiment, the batch pressure reactor contains no inert gas. Embodiments of such dopants or such hydrocarbons are described above.

In Phase 3, in other words generally after the batch pressure reactor has been charged with the silicon-containing precursors, the batch pressure reactor, which in general is closed, is heated until the target temperature is reached. At the target temperature, decomposition of silicon-containing precursors begins, with deposition of silicon in pores and optionally on the surface of the porous particles. The beginning of the decomposition of silicon-containing precursors with deposition of silicon may be ascertained experimentally by an increase in pressure in the batch pressure reactor that is not brought about by an increase in temperature in the batch pressure reactor. In the case of the decomposition of silicon-containing precursors, gaseous molecules are generally formed as well as silicon, and bring about an increase in the pressure in the batch pressure reactor. The volume of the batch pressure reactor remains generally constant during the implementation of the process. Decomposition temperatures are also listed in standard chemical tables concerning the properties of chemical substances.

Preferably, in Phase 3, the pressure change on heating of the closed batch pressure reactor is dependent essentially on the temperature change, as may be described, for example, by the thermodynamic state equation in accordance with equation 1:

$$dp_{Phase\ 3} = \left(\frac{\partial p}{\partial T}\right)_{V,n} dT$$

After attainment of the target temperature for the decomposition of the silicon-containing precursors in Phase 3, the temperature in Phase 4 in the batch pressure reactor may in relation to the target temperature of Phase 3 be—for example—raised, kept constant, or lowered to a small extent.

The temperature, the pressure, or differential pressure measurements in the batch pressure reactor in Phase 3 may be determined using techniques and apparatuses for measurement that are common for batch pressure reactor. Following customary calibration, different measuring apparatuses produce the same results.

The target temperature is situated preferably in the range from 370 to 1000° C., more preferably 390 to 800° C., and most preferably 400 to 550° C. For $SiH_4$, for example, the target temperatures are preferably between 370 and 500° C., more preferably in the range from 390 to 450° C. and very preferably in the range from 400 to 420° C. The target temperatures for $HSiCl_3$ are preferably between 400 and 1000° C., more preferably in the 600 to 800° C. range. The target temperatures for $H_2SiCl_2$ are preferably between 350 and 800° C., more preferably in the 450 to 550° C. range.

In the case where hydrocarbons are charged, the target temperatures applied at the end of Phase 3 and during Phase 4 are preferably temperatures at which the decomposition of the hydrocarbons begins and carbon is deposited in pores and optionally on the surface of the porous particles. In this embodiment the target temperatures selected are preferably in the range from 250 to 1000° C., more preferably from 350 to 850° C., and most preferably from 450 to 650° C.

The pressure in the batch pressure reactor during Phase 4 increases to preferably at least 7 bar.

In one preferred embodiment, the progress of reaction in the course of the process is monitored on the basis of pressure changes. In this way it is possible, for example, to ascertain the degree of infiltration or the end of infiltration. Infiltration refers to the deposition of silicon in pores and optionally on the surface of the porous particles in Phase 4. The end of infiltration may be determined, for example, from the absence of any further pressure increase.

The pressure change in the batch pressure reactor during Phase 4 arises generally substantially from the temperature change and/or amount-of-substance change in the course of the deposition of silicon, as represented for example by equation 2:

$$dp_{Phase\ 4} = \left(\frac{\partial p}{\partial T}\right)_{V,n_i} dT + \sum_{i,i \neq j}\left(\frac{\partial p}{\partial n_i}\right)_{V,T,n_j} dn_i$$

The pressure change in Phase 4 is preferably a product substantially of the amount-of-substance change in the course of the deposition of silicon. Advantageously, therefore, the end of the reaction of a silicon-containing precursors can be recognized from the absence of any further pressure increase at the end of Phase 4, and so the further phases can be effectively triggered in terms of time without the unnecessary removal of unreacted silicon-containing precursors from the reactor, with a complete conversion being achieved.

In Phase 4, the temperature is preferably not increased by heating. The temperature in Phase 4 increases preferably as a result of the heat resulting from the possibly exothermic decomposition of the silicon-containing precursors. Additionally preferred is a slight temperature drop in Phase 4, more preferably of at maximum 20° C. during Phase 4.

The pressure increase in the batch pressure reactor in Phase 4 (decomposition of the silicon-containing precursors) is preferably higher than in Phase 3 (heating of the batch pressure reactor), this being represented, for example, by equation 3a or 3b:

$$dp_{Phase\ 4} > dp_{Phase\ 3}, \text{ or} \quad (3a)$$

$$\left[\left(\frac{\partial p}{\partial T}\right)_{V,n_i} dT + \sum_{i,i \neq j}\left(\frac{\partial p}{\partial n_i}\right)_{V,T,n_j} dn_i\right]_{Phase\ 4} > \left[\left(\frac{\partial p}{\partial T}\right)_{V,n} dT\right]_{Phase\ 3}. \quad (3b)$$

In Phase 4, the pressure in the batch pressure reactor preferably reaches at least 10 bar, more preferably at least 50 bar, and more preferably at least 100 bar. The pressure in the batch pressure reactor in Phase 4 preferably remains below 400 bar, more preferably below 300 bar, and especially preferably at below 200 bar.

The temperature prevailing in the batch pressure reactor in Phase 4 is in the range from preferably 100 to 1000° C., more preferably in the range from 300 to 900° C., and most preferably in the range from 380 to 750° C.

The temperature, the pressure, pressure changes or differential pressure measurements in the batch pressure reactor in Phase 4 may be determined using techniques and apparatuses for measurement that are common for batch pressure reactors. Following customary calibration, different measuring apparatuses produce the same results. Amounts of substance or amount-of-substance changes may be determined, for example, by withdrawing a sample of defined volume from the batch pressure reactor and determining its substantive composition in a conventional way by means of gas chromatography.

The heating of the batch pressure reactor in Phase 3 and optionally in Phase 4 may take place, for example, at a constant heating rate or at a plurality of different heating rates. Heating rates may be adapted by the skilled person in each individual case according to the design of the process—according, for example, to the size of the reactor, to the amount of porous particles in the reactor, to the strring technology, or to the planned reaction time. The entire batch pressure reactor is preferably heated in Phase 3 at a rate such that in spite of the rapid heating, the maximum temperature gradient in the batch pressure reactor at a temperature at which the decomposition of the silicon-containing precursors begins remains below 1000° C./m, more preferably below 100° C./m, and very preferably below 10° C./m. In this way it is possible, for example, to ensure that the predominant portion of the silicon is deposited in the pores of the porous particles and not on their outer surfaces.

The temperature at which the decomposition of the silicon-containing precursors begins may depend, for example, on the porous particles used or on the silicon-containing precursors used, and on the other boundary conditions of the decomposition, such as, for example, the partial pressure of the silicon-containing precursors at the moment of the decomposition, and the presence of other reactive components, such as catalysts, for example, which influence the decomposition reaction.

The heating of the batch pressure reactor in Phase 3 takes place preferably at heating rates of 1 to 100° C. per minute, more preferably at heating rates of 2 to 50° C. per minute, and very preferably at a heating rate of 3 to 10° C. per minute.

During the decomposition of the silicon-containing precursors in Phase 4, the temperature may be kept constant or else varied. The objective is the largely complete conversion of the silicon-containing precursors in as short a time as possible, with generation of a silicon-containing material suitable for use.

In order to control the rate of the pressure increase in the various phases of the operation, there are a variety of technical solutions that can be used. In order to increase or reduce the pressure increase, the heat supplied to the reactor contents is preferably increased or reduced, respectively. In order to reduce the rate of pressure increase, it is preferable also to increase the removal of heat from the batch pressure reactor by cooling; for this purpose, preferably one or more reactor walls are cooled or facilities are introduced into the reactor for the removal of heat, examples being cooling pipes or cooling ribs. In order to control the pressure in the reactor very quickly, preference is given to supplying or removing small amounts of gas from the batch pressure reactor, or supplying evaporating liquids. In this context, the substream removed from the batch pressure reactor, after cooling and/or removal of a portion of the overall stream, is preferably returned again wholly or partly into the reactor contents in a closed circuit.

The course of the reaction in Phase 4 is preferably monitored analytically, in order to recognize the end of the reaction and so to minimize the reactor occupancy time. Methods for observing the course of the reaction include, for example, temperature measurement for determining exothermic or endothermic events, pressure measurements for determining the course of the reaction through changing ratios of solid to gaseous reactor content constituents, and also further techniques which enable observation of the changing composition of the gas space during the reaction.

Preference is given to monitoring the change in the pressure, especially the increase in the pressure, in the batch pressure reactor during the implementation of the process. The increase is an indicator of the deposition rate and therefore a pointer to the remaining surface area in the porous particles and/or in the resultant silicon-containing material.

In Phase 5, the batch pressure reactor is cooled. Cooling takes place preferably after the end of the deposition, optionally to below the target temperature, preferably to the temperature for Phase 6.

In Phase 6, the gaseous byproducts of the reaction, formed in the course of the deposition, are removed preferably at the temperature of the deposition or after attainment of the temperature desired for the removal of the gaseous reaction byproducts, removal taking place from the gas space of the batch pressure reactor, by purging, for example. The use of a purge gas is preferred. Before being charged with purge gas, the batch pressure reactor is preferably evacuated at least once. Preferred purge gases are inert gases, such as, noble gases, for example helium, neon, argon, krypton, xenon, or hydrogen or nitrogen or carbon dioxide, and can be used individually or as mixtures, or mixtures thereof with oxygen, such as air or lean air, for example.

The batch pressure reactor is preferably purged with a mixture of inert gas and oxygen. In this way it is possible, for example, to modify—to deactivate, for example—the surface of the silicon-containing composite particles. It is possible for example to achieve a reaction of any reactive groups present on the surface of the silicon-containing composite particles. The mixture of nitrogen and oxygen contains preferably at most 20 vol %, more preferably at most 10 vol %, and especially preferably at most 5 vol % of oxygen. This step takes place preferably at temperatures of at most 200° C., more preferably at most 100° C., and especially preferably at most 50° C.

In Phase 7 of the process, silicon-containing composite particles are withdrawn from the batch pressure reactor, optionally with retention of an inert gas atmosphere present in the batch pressure reactor.

In one preferred embodiment of the process, Phases 2 to 6 are repeated multiply, in which case the silicon-containing precursors charged in Phase 2 may be the same or different in each case.

In a further preferred embodiment of the process, Phase 6 follows Phase 4 directly; in other words, Phase 5 can be omitted; in other words, after Phase 4, it is also possible to continue with Phase 6 without cooling the batch pressure reactor.

In a further preferred embodiment of the process, Phases 2 to 6 are repeated singly or multiply, in which case optionally, in one or more repetitions, Phase 6 is omitted.

In a further preferred embodiment Phases 2 to 6, optionally with omission of Phase 5, are singly or multiply repeated (reaction cycle), in which case, in individual or multiple repetitions, it is also possible to employ silicon-free reactive components, in which case the silicon-free reactive components in the respective repetitions may be the same or different, with the proviso that in at least one reaction cycle a reactive component is used which comprises silicon-containing precursors. Silicon-free reactive components preferably contain no silicon-containing precursors. Silicon-free reactive components preferably comprise one or more hydrocarbons. In this preferred embodiment, the silicon-free reactive component may be used in a repetition of Phases 2 to 6. Preferred silicon-free reactive components are hydrocarbons. When using silicon-free reactive components, carbon is preferably deposited in pores and optionally on the surface of the porous particles or of the silicon-containing composite particles.

In one particularly preferred embodiment, in a first reaction cycle, in Phase 2, one or more silicon-containing precursors are charged, and in the second reaction cycle a reactive component comprising one or more hydrocarbons are charged, this latter component preferably containing no silicon-containing precursor; optionally, Phase 5 is omitted. By this means it is possible, for example, to obtain silicon-containing composite particles which have no outwardly directed free silicon surface.

In a further preferred embodiment, in a first reaction cycle, in Phase 2, a reactive component comprising at least one hydrocarbon and containing no silicon-containing precursor is charged, and in the second reaction cycle a reactive component comprising one or more silicon-containing precursors is used, with optional omission of Phase 5. Optionally, in a third reaction cycle, a further hydrocarbon-containing reactive component which contains no silicon-containing precursor is used, with optional omission of Phase 5. Becoming obtainable as a result, for example, are silicon-containing composite particles which have a carbon layer between porous particles and the deposited silicon and which optionally additionally carries an outer carbon layer, meaning that there is no outwardly directed free silicon surface present. Preferred reactive components different from silicon-containing precursors are one or more hydrocarbons. Hydrocarbons and their preferred embodiments are described above.

The reactive components which comprise one or more hydrocarbons but no silicon-containing precursor preferably contain no further component or one or more inert gases and/or hydrogen and/or one or more dopants. Dopants and their preferred embodiments are described above.

During Phases 2 to 6, the porous particles and also the resultant silicon-containing composite particles may generally be present in the form of a stationary bed or may be in agitated form with commixing. An agitated commixing of the porous particles and/or of the resultant silicon-containing composite particles in the batch pressure reactor is preferred. It allows, for example, homogeneous contact of all the porous particles with reactive components, particularly the silicon-containing precursors, or homogeneous temperature distribution in the bed. The particles may be agitated, for example, by stirring internals in the reactor, by the movement of the reactor as a whole, or else by fluidization of the solids in the reactor with a gas flow.

The instant process steps a)~c) are preferably divided into the above process Phases 1 to 7, more preferably the steps b)~c) are divided into the process Phases 1 to 7. The step b) comprises preferably the Phases 1 and 2. The step c) comprises preferably the Phases 3 to 7, particularly the Phases 3 and 4.

The silicon-containing composite particles obtainable by the processes of the Invention have a volume-weighted particle size distribution with diameter percentiles $d_{50}$ preferably in a range from 0.5 to 20 µm. The $d_{50}$ value is preferably at least 1.5 µm, and more preferably at least 2 µm. The diameter percentiles $d_{50}$ are preferably at most 13 µm and more preferably at most 8 µm.

The volume-weighted particle size distribution of the silicon-containing composite particles is situated preferably between the diameter percentiles $d_{10} \geq 0.2$ µm and $d_{90} \leq 20.0$ μm, more preferably between $d_{10} \geq 0.4$ μm and $d_{90} \leq 15.0$ μm, and most preferably between $d_{10} \geq 0.6$ μm to $d_{90} \leq 12.0$ μm.

The silicon-containing composite particles have a volume-weighted particle size distribution with diameter percentiles $d_{10}$ of preferably $\leq 10$ μm, more preferably $\leq 5$ μm, especially preferably $\leq 3$ μm and most preferably $\leq 1$ μm. The diameter percentiles $d_{10}$ are preferably $\geq 0.2$ μm, more preferably $\geq 0.4$ μm and most preferably $2:0.6$ μm.

The silicon-containing composite particles have a volume-weighted particle size distribution with diameter percentiles $d_{90}$ of preferably $\geq 5$ μm and more preferably $\geq 10$ μm. The diameter percentiles $d_{90}$ are preferably $\leq 20$ μm, more preferably $\leq 15$ μm and most preferably $\leq 12$ μm.

The volume-weighted particle size distribution of the silicon-containing composite particles has a $d_{90}-d_{10}$ differential of preferably $\leq 15.0$ μm, more preferably $\leq 12.0$ μm, more preferably $\leq 10.0$ μm, especially preferably $\leq 8.0$ μm, and most preferably $\leq 4.0$ μm. The volume-weighted particle size distribution of the silicon-containing composite particles has a $d_{90}-d_{10}$ differential of preferably $\geq 0.6$ μm, more preferably $\geq 0.8$ μm and most preferably $\geq 1.0$ μm.

The silicon-containing composite particles may be isolated or agglomerated. The silicon-containing composite particles are preferably not aggregated and preferably not agglomerated. The terms isolated, agglomerated and unaggregated have already been defined earlier on above in relation to the porous particles. The presence of silicon-containing composite particles in the form of aggregates or agglomerates may be made visible, for example, by means of conventional scanning electron microscopy (SEM).

The silicon-containing composite particles may have any desired morphology, and may therefore, for example, be platy, irregular-shaped, splinter shaped, spherical or else acicular, with splinter shaped or spherical particles being preferred.

According to the definition of Wadell, the sphericity ψ is the ratio of the surface area of a sphere of equal volume to the actual surface area of a body. In the case of a sphere, the value of p is 1. According to this definition, the silicon-containing composite particles accessible by the process of the Invention have a sphericity ψ of preferably 0.3 to 1.0, more preferably of 0.5 to 1.0, and most preferably of 0.65 to 1.0.

The sphericity S is the ratio of the circumference of an equivalent circle with the same area A as the projection of the particle projected onto a surface, to the measured circumference U of this projection: $S=2\sqrt{\pi A}/U$. In the case of a particle of ideal circularity, the value of S would be 1. For the silicon-containing composite particles accessible by the process of the invention, the sphericity S is in the range from preferably 0.5 to 1.0 and more preferably from 0.65 to 1.0, based on the percentiles $S_{10}$ to $S_{90}$ of the numerical sphericity distribution. The sphericity S is measured, for example, from optical micrographs of individual particles or preferably, in the case of particles smaller than 10 μm, with a scanning electron microscope, by graphic evaluation by means of image analysis software, such as ImageJ, for example.

The cycling stability of lithium-ion batteries can be Increased further via the morphology, the material composition, in particular the specific surface area or the internal porosity of the silicon-containing composite particles.

The silicon-containing composite particles contain preferably 10 to 90 wt %, more preferably 20 to 80 wt %, very preferably 30 to 60 wt % and especially preferably 40 to 50 wt % of porous particles, based on the total weight of the silicon-containing composite particles.

The silicon-containing composite particles contain preferably 10 to 90 wt %, more preferably 20 to 80 wt %, very preferably 30 to 60 wt % and especially preferably 40 to 50 wt % of silicon obtained via deposition from the silicon-containing precursors, based on the total weight of the silicon-containing composite particles (determined preferably by elemental analysis, such as ICP-OES).

If the porous particles comprise silicon compounds, for example silicon dioxide, the above-mentioned wt % figures for the silicon obtained via deposition from the silicon-containing precursors can be determined by subtracting the silicon mass in the porous particles, ascertained by elemental analysis, from the silicon mass in the silicon-containing composite particles, ascertained by elemental analysis, and dividing the result by the mass of the silicon-containing composite particles.

The volume of the silicon contained in the silicon-containing composite particles and obtained via deposition from the silicon-containing precursor is a product of the mass fraction of the silicon obtained via deposition from the silicon-containing precursor, as a proportion of the total mass of the silicon-containing composite particles, divided by the density of silicon (2.336 g/cm$^3$).

The pore volume P of the silicon-containing composite particles is a product of the sum of gas-accessible and gas-inaccessible pore volume. The Gurwich gas-accessible pore volume of the silicon-containing composite particles can be determined by gas sorption measurements with nitrogen in accordance with DIN 66134.

The gas-inaccessible pore volume of the silicon-containing composite particles can be determined using the formula:

Gas-inaccessible pore volume=(1/pure-material density)−(1/skeletal density).

Here, the pure-material density of the silicon-containing composite particles is a theoretical density which can be calculated from the sum of the theoretical pure-material densities of the components contained in the silicon-containing composite particles, multiplied by their respective weight-based percentage fraction in the overall material. Accordingly, for example, for silicon-containing composite particles wherein silicon is deposited on a porous particle:

Pure-material density=(theoretical pure-material density of the silicon×fraction of the silicon in wt %)+(theoretical pure-material density of the porous particles×fraction of the porous particles in wt %).

Data on pure-material densities can be taken by the skilled person from, for example, the Ceramic Data Portal of the National Institute of Standards (NIST, https://srdata.nist.gov/CeramicDataPortal/scd). For example, the pure-material density of carbon is 2.2 to 2.3 g/m$^3$, that of silicon oxide is 2.203 g/cm$^3$, that of boron nitride is 2.25 g cm$^3$, that of silicon nitride is 3.44 g/cm$^3$, and that of silicon carbide is 3.21 g/cm$^3$.

The pore volume P of the silicon-containing composite particles is situated preferably in the range from 0 to 400 vol %, more preferably in the range of 100 to 350 vol % and even more preferably in the range from 200 to 350 vol %, based on the volume of the silicon contained in the silicon-containing composite particles and obtained from the deposition of the silicon-containing precursor.

The porosity contained in the silicon-containing composite particles may be both gas-accessible and gas-inaccessible. The ratio of the volume of gas-accessible to gas-inaccessible porosity of the silicon-containing composite particles may be situated generally in the range from 0 (no gas-accessible pores) to 1 (all pores are gas-accessible). The ratio of the volume of gas-accessible to gas-inaccessible porosity of the silicon-containing composite particles is situated preferably in the range from 0 to 0.8, more preferably in the range from 0 to 0.3, and especially preferably from 0 to 0.1.

The pores of the silicon-containing composite particles may have any desired diameters, being situated, for example, in the range of macropores (>50 nm), mesopores (2-50 nm) and micropores (<2 nm). The silicon-containing composite particles may also contain any desired mixtures of different pore types. The silicon-containing composite particles preferably contains at most 30% of macropores, based on the total pore volume, particular preference being given to silicon-containing composite particles without macropores, and very particular preference to silicon-containing composite particles having at least 50% of pores, based on the total pore volume, having a mean pore diameter of below 5 nm. With more particular preference the silicon-containing composite particles exclusively have pores with a diameter of at most 2 nm.

The silicon-containing composite particles comprise silicon structures which in at least one dimension have structure sizes of preferably at most 1000 nm, more preferably less than 100 nm, very preferably less than 5 nm (method of determination: scanning electron microscopy (SEM) and/or high-resolution transmission electron microscopy (HR-TEM)).

The silicon-containing composite particles preferably comprise silicon layers having a layer thickness of below 1000 nm, more preferably less than 100 nm, very preferably less than 5 nm (method of determination: scanning electron microscopy (SEM) and/or high-resolution transmission electron microscopy (HR-TEM)). The silicon-containing composite particles may also comprise silicon in the form of particles. The silicon particles have a diameter of preferably at most 1000 nm, more preferably less than 100 nm, very preferably less than 5 nm (method of determination: scanning electron microscopy (SEM) and/or high-resolution transmission electron microscopy (HR-TEM)). The figure for the silicon particles here is based preferably on the diameter of the circle around the particles in the microscope image.

The silicon-containing composite particles have a specific surface area of at most 50 $m^2/g$, preferably less than 30 $m^2/g$, and especially preferably less than 10 $m^2/g$. The BET surface area is determined according to DIN 66131 (with nitrogen). Accordingly, when the silicon-containing composite particles are used as active material in anodes for lithium-ion batteries, SEI formation can be reduced and the initial coulombic efficiency can be enhanced.

The silicon in the silicon-containing composite particles, deposited from the silicon-containing precursor, may further comprise one or more dopants, selected for example from the group comprising Li, Fe, Al, Cu, Ca, K, Na, S, Cl, Zr, Ti, Pt, Ni, Cr, Sn, Mg, Ag, Co, Zn, B, P, Sb, Pb, Ge, Bi and rare earths. Preference here is given to lithium and/or tin. The amount of dopants in the silicon-containing composite particles is preferably at most 1 wt % and more preferably at most 100 ppm, based on the total weight of the silicon-containing composite particles, determinable by means of ICP-OES.

The silicon-containing composite particles generally have generally a surprisingly high stability under compressive and/or shearing load. The pressure stability and shear stability of the silicon-containing composite particles are manifested, for example, by the absence or virtual absence of changes in the porous structure of the silicon-containing composite particles in the SEM under compressive load (for example on electrode compaction) and, respectively, shearing load (for example, on preparation of the electrodes).

The silicon-containing composite particles may optionally further comprise elements, such as carbon. Carbon is present preferably in the form of thin layers having a layer thickness of at most 1 μm, preferably less than 100 nm, more preferably less than 5 nm, and very preferably less than 1 nm (determinable via SEM or HR-TEM). These carbon layers may be present both in pores and on the surface of the silicon-containing composite particles. The sequence of different layers in the silicon-containing composite particles through corresponding repetitions of Phases 2 to 6, and also their number, are also arbitrary. Accordingly, there may first be a layer, on the porous particles, of a further material, different from the porous particles, such as carbon, for example, and that layer may bear a silicon layer or a layer of silicon particles. Also possible is the presence, on the silicon layer or on the layer of silicon particles, of a layer, in turn, of a further material, which may be different from or the same as the material of the porous particles, irrespective of whether, between the porous particles and silicon layer or the layer consisting of silicon particles, there is a further layer of a material different from the material of the porous particles. The process of the invention proves here to be particularly advantageous, since the repetitions of Phases 2 to 6 are able to follow one another directly without interruption through opening of the batch pressure reactor.

The silicon-containing composite particles contain preferably ≤50 wt %, more preferably ≤40 wt % and especially preferably ≤20 wt % of additional elements. The silicon-containing composite particles contain preferably ≥1 wt %, more preferably ≥3 wt % and especially preferably ≥2 wt % of additional elements. The figures in wt % are based on the total weight of the silicon-containing composite particles. In an alternative embodiment, the silicon-containing composite particles contain no additional elements.

In a second aspect of the Invention, there is provided a composition comprising or consisting of a particulate material, i.e. the instant silicon-containing composite particle, obtainable by a process according to the invention. In particular, there is provided a composition comprising silicon-containing composite particles obtained by the process of the invention and at least one other component selected from: (i) a binder; (ii) a conductive additive; and (iii) an additional particulate electroactive material. The composition according to the second aspect of the invention is useful as an electrode composition, and thus may be used to form the active layer of an electrode.

The composition may be a hybrid electrode composition which comprises the silicon-containing composite particles and at least one additional particulate electroactive material. Examples of additional particulate electroactive materials include graphite, hard carbon, silicon, tin, germanium, aluminium and lead. The at least one additional particulate electroactive material is preferably selected from graphite and hard carbon, and most preferably the at least one additional particulate electroactive material is graphite.

In the case of a hybrid electrode composition, the composition preferably comprises from 3 to 60 wt %, or from 3 to 50 wt %, or from 5 to 50 wt %, or from 10 to 50 wt %, or from 15 to 50 wt %, of the silicon-containing composite particles, based on the total dry weight of the composition.

The at least one additional particulate electroactive material is suitably present in an amount of from 20 to 95 wt %, or from 25 to 90 wt %, or from 30 to 750 wt % of the at least one additional particulate electroactive material.

The at least one additional particulate electroactive material preferably has a $D_{50}$ particle diameter in the range from 10 to 50 μm, preferably from 10 to 40 μm, more preferably from 10 to 30 μm and most preferably from 10 to 25 μm, for example from 15 to 25 μm.

The $D_{10}$ particle diameter of the at least one additional particulate electroactive material is preferably at least 5 μm, more preferably at least 6 μm, more preferably at least 7 μm, more preferably at least 8 μm, more preferably at least 9 μm, and still more preferably at least 10 μm.

The $D_{90}$ particle diameter of the at least one additional particulate electroactive material is preferably up to 100 μm, more preferably up to 80 μm, more preferably up to 60 μm, more preferably up to 50 μm, and most preferably up to 40 μm.

The at least one additional particulate electroactive material is preferably selected from carbon-comprising particles, graphite particles and/or hard carbon particles, wherein the graphite and hard carbon particles have a $D_{50}$ particle diameter in the range from 10 to 50 μm. Still more preferably, the at least one additional particulate electroactive material is selected from graphite particles, wherein the graphite particles have a $D_{50}$ particle diameter in the range from 10 to 50 μm.

The composition may also be a non-hybrid (or "high loading") electrode composition which is substantially free of additional particulate electroactive materials. In this context, the term "substantially free of additional particulate electroactive materials" should be interpreted as meaning that the composition comprises less than 15 wt %, preferably less than 10 wt %, preferably less than 5 wt %, preferably less than 2 wt %, more preferably less than 1 wt %, more preferably less than 0.5 wt % of any additional electroactive materials (i.e. additional materials which are capable of inserting and releasing metal ions during the charging and discharging of a battery), based on the total dry weight of the composition.

A "high-loading" electrode composition of this type preferably comprises at least 50 wt %, or at least 60 wt %, or at least 70 wt %, or at least 80 wt %, or at least 90 wt % of the silicon-containing composite particles obtained according to the process of the invention, based on the total dry weight of the composition.

The composition may optionally comprise a binder. A binder functions to adhere the composition to a current collector and to maintain the integrity of the composition. Examples of binders which may be used in accordance with the present invention include polyvinylidene fluoride (PVDF), polyacrylic acid (PAA) and alkali metal salts thereof, modified polyacrylic acid (mPAA) and alkali metal salts thereof, carboxymethylcellulose (CMC), modified carboxymethylcellulose (mCMC), sodium carboxymethylcellulose (Na-CMC), polyvinylalcohol (PVA), alginates and alkali metal salts thereof, styrene-butadiene rubber (SBR) and polyimide. The composition may comprise a mixture of binders. Preferably, the binder comprises polymers selected from polyacrylic acid (PAA) and alkali metal salts thereof, and modified polyacrylic acid (mPAA) and alkali metal salts thereof, SBR and CMC.

The binder may suitably be present in an amount of from 0.5 to 20 wt %, preferably 1 to 15 wt %, preferably 2 to 10 wt % and most preferably 5 to 10 wt %, based on the total dry weight of the composition.

The binder may optionally be present in combination with one or more additives that modify the properties of the binder, such as cross-linking accelerators, coupling agents and/or adhesive accelerators.

The composition may optionally comprise one or more conductive additives. Preferred conductive additives are non-electroactive materials that are included so as to improve electrical conductivity between the electroactive components of the composition and between the electroactive components of the composition and a current collector. The conductive additives may be selected from carbon black, carbon fibres, carbon nanotubes, graphene, acetylene black, ketjen black, metal fibres, metal powders and conductive metal oxides. Preferred conductive additives include carbon black and carbon nanotubes.

The one or more conductive additives may suitably be present in a total amount of from 0.5 to 20 wt %, preferably 1 to 15 wt %, preferably 2 to 10 wt % and most preferably 5 to 10 wt %, based on the total dry weight of the composition.

In a third aspect, the invention provides an electrode comprising silicon-containing composite particles obtainable by a process according to the invention in electrical contact with a current collector. The particulate material used to prepare the electrode of the third aspect of the invention may be in the form of a composition according to the second aspect of the invention.

As used herein, the term current collector refers to any conductive substrate that is capable of carrying a current to and from the electroactive particles in the composition. Examples of materials that can be used as the current collector Include copper, aluminium, stainless steel, nickel, titanium and sintered carbon. Copper is a preferred material. The current collector is typically in the form of a foil or mesh having a thickness of between 3 to 500 μm. The particulate materials of the invention may be applied to one or both surfaces of the current collector to a thickness which is preferably in the range from 10 μm to 1 mm, for example from 20 to 500 μm, or from 50 to 200 μm.

The electrode of the third aspect of the invention may be fabricated by combining the silicon-containing composite particles of the invention with a solvent and optionally one or more viscosity modifying additives to form a slurry. The slurry is then cast onto the surface of a current collector and the solvent is removed, thereby forming an electrode layer on the surface of the current collector. Further steps, such as heat treatment to cure any binders and/or calendaring of the electrode layer may be carried out as appropriate. The electrode layer suitably has a thickness in the range from 20 μm to 2 mm, preferably 20 μm to 1 mm, preferably 20 μm to 500 μm, preferably 20 μm to 200 μm, preferably 20 μm to 100 μm, preferably 20 μm to 50 μm.

Alternatively, the slurry may be formed into a freestanding film or mat comprising the particulate material of the invention, for instance by casting the slurry onto a suitable casting template, removing the solvent and then removing the casting template. The resulting film or mat is in the form of a cohesive, freestanding mass that may then be bonded to a current collector by known methods.

The electrode of the third aspect of the invention may be used as the anode of a metal-ion battery. Thus, in a fourth aspect, the present invention provides a rechargeable metal-ion battery comprising an anode, the anode comprising an electrode as described above, a cathode comprising a cathode active material capable of releasing and reabsorbing metal ions; and an electrolyte between the anode and the cathode.

The metal ions are preferably lithium ions. More preferably, the rechargeable metal-ion battery of the Invention is a lithium-ion battery, and the cathode active material is capable of releasing and accepting lithium ions.

The cathode active material is preferably a metal oxide-based composite. Examples of suitable cathode active materials include $LiCoO_2$, $LiCo_{0.99}Al_{0.01}O_2$, $LiNiO_2$, $LiMnO_2$, $LiCo_{0.5}Ni_{0.5}O_2$, $LiCo_{0.7}Ni_{0.3}O_2$, $LiCo_{0.8}Ni_{0.2}O_2$, $LiCo_{0.82}Ni_{0.18}O_2$, $LiCo_{0.8}Ni_{0.15}Al_{0.05}O_2$, $LiNi_{0.4}Co_{0.3}Mn_{0.3}O_2$ and $LiNi_{0.33}Co_{0.33}Mn_{0.34}O_2$. The cathode current collector is generally of a thickness of between 3 to 500 μm. Examples of materials that can be used as the cathode current collector include aluminium, stainless steel, nickel, titanium and sintered carbon.

The electrolyte is suitably a non-aqueous electrolyte containing a metal salt, e.g. a lithium salt, and may include, without limitation, non-aqueous electrolytic solutions, solid electrolytes and inorganic solid electrolytes. Examples of non-aqueous electrolyte solutions that can be used include non-protic organic solvents such as propylene carbonate, ethylene carbonate, butylene carbonates, dimethyl carbonate, diethyl carbonate, gamma butyrolactone, 1,2-dimethoxyethane, 2-methytetrahydrofuran, dimethylsulfoxide, 1,3-dioxolane, formamide, dimethylformamide, acetonitrile, nitromethane, methylformate, methyl acetate, phosphoric acid triesters, trimethoxymethane, sulfolane, methyl sulfolane and 1,3-dimethyl-2-imidazolidinone.

Examples of organic solid electrolytes include polyethylene derivatives polyethyleneoxide derivatives, polypropylene oxide derivatives, phosphoric acid ester polymers, polyester sulfide, polyvinylalcohols, polyvinylidine fluoride and polymers containing ionic dissociation groups.

Examples of inorganic solid electrolytes include nitrides, halides and sulfides of lithium salts such as $Li_5NI_2$, $Li_3N$, $LiI$, $LiSiO_4$, $Li_2SiS_3$, $Li_4SiO_4$, $LiOH$ and $Li_3PO_4$.

The lithium salt is suitably soluble in the chosen solvent or mixture of solvents. Examples of suitable lithium salts include $LiCl$, $LiBr$, $LiI$, $LiClO_4$, $LiBF_4$, $LiBC_4O_6$, $LiPF_6$, $LiCF_3SO_3$, $LiAsF_6$, $LiSbF_6$, $LiAlCl_4$, $CH_3SO_3Li$ and $CF_3SO_3Li$.

Where the electrolyte is a non-aqueous organic solution, the metal-ion battery is preferably provided with a separator interposed between the anode and the cathode. The separator is typically formed of an insulating material having high ion permeability and high mechanical strength. The separator typically has a pore diameter of between 0.01 and 100 μm and a thickness of between 5 and 300 μm. Examples of suitable electrode separators include a micro-porous polyethylene film.

The separator may be replaced by a polymer electrolyte material and in such cases the polymer electrolyte material is present within both the composite anode layer and the composite cathode layer. The polymer electrolyte material can be a solid polymer electrolyte or a gel-type polymer electrolyte.

EXAMPLES

The examples which follow serve for further elucidation of the invention described here.

Analytical methods and instruments used for the characterization were as follows:

Scanning electron microscopy (SEM/EDX):

The microscopic analyses were carried out with a Zeiss Ultra 55 scanning electron microscope and an Oxford X-Max 80N energy-dispersive x-ray spectrometer. Prior to the analysis, the samples were subjected to vapour deposition of carbon with a Safematic Compact Coating Unit 010/HV In order to prevent charging phenomenon. The cross sections of the silicon-containing composite particles were produced using a Leica TIC 3X ion cutter at 6 kV.

Inorganic Analysis/Elemental Analysis:

The C contents reported in the examples were ascertained using a Leco CS 230 analyzer; for determination of O and, where appropriate N and H contents, a Leco TCH-800 analyzer was used. The qualitative and quantitative determination of other reported elements took place by means of ICP (inductively coupled plasma) emission spectrometry (Optima 7300 DV, from Perkin Elmer). For this analysis, the samples were subjected to acid digestion ($HF/HNO_3$) in a microwave (Microwave 3000, from Anton Paar). The ICP-OES determination is guided by ISO 11885 "Water quality—Determination of selected elements by inductively coupled plasma optical emission spectrometry (ICP-OES) (ISO 11885:2007); German version EN ISO 11885:2009", which is used for analysis of acidic, aqueous solutions (e.g., acidified samples of drinking water, wastewater and other water, aqua regia extracts of soils and sediments).

Particle Size Determination:

The particle size distribution was determined in the context of this invention according to ISO 13320 by means of static laser scattering using a Horiba LA 950. In the preparation of the samples, particular attention must be paid here to the dispersing of the particles in the measurement solution, so as not to measure the size of agglomerates rather than that of individual particles. For the measurement, the particles were dispersed in ethanol. For this purpose the dispersion, prior to the measurement, was treated as and when required with 250 W ultrasound in a Hielscher model UIS250v ultrasound laboratory instrument with LS24d5 sonotrode for 4 minutes.

BET Surface Area Measurement:

The specific surface area of the materials was measured via gas adsorption with nitrogen, using a Sorptomatic 199090 instrument (Porotec) or an SA-9603MP instrument (Horiba) by the BET method (determination according to DIN ISO 9277:2003-05 with nitrogen).

Skeletal Density:

The skeletal density. i.e., the density of the porous solid based on the volume exclusively of the pore spaces gas-accessible from the outside, was determined by means of He pycnometry in accordance with DIN 66137-2.

Gurwich Gas-Accessible Pore Volume:

The Gurwich gas-accessible pore volume was determined by gas sorption measurements with nitrogen in accordance with DIN 66134.

PD50 Pore Diameter:

The PD50 pore diameter was calculated as the volume-based median pore diameter, based on the total volume of micropores, defined with Horvath-Kawazoe method in accordance with DIN 66135, and mesopores, defined with BJH method in accordance with DIN 66134.

Materials and apparatus used when carrying out experimental examples were as follows:

The autoclaves used consisted of a cylindrical lower part (beaker) and a lid with a number of connections (for example, for gas supply, gas removal, temperature measurement and pressure measurement), The volume of the autoclaves was 594 ml (AK1), 312 ml (AK2) and 5300 ml (AK3). The autoclave was heated electrically. The stirrer used was a very close-clearance helical stirrer. The height of this stirrer was around 50% of the clear height of the reactor Interior. The helical stirrer had a construction designed to allow temperature measurement directly in the bed.

The SiH$_4$ used, of grade 4.0, was acquired from Linde GmbH.

Porous Particles Used:

The porous particles 1 to 6 are porous carbons, the porous particle 7 is a porous silicon oxide, and the porous particle 8 is a porous boron nitride.

The composition and certain physical properties of the porous particles 1 to 8 used are reproduced in Table 1.

Examples 1 to 23

Production of silicon-containing composite particles using monosilane SiH$_4$ as silicon-containing precursor:

The respective values for the parameters A-L, the material numbers X of the porous particles, and the type of autoclaves are summarized in Table 2.

In Phase 1, an autoclave was filled with the amount A g of porous material X and closed, wherein K is the charge of the porous particles per litre of rector volume. In Phase 2, the autoclave was first evacuated. Then an amount B g of SiH$_4$ was applied with a pressure of C bar, wherein the charge of Si per litre of reactor volume is L. In Phase 3, the autoclave was heated within D minutes to a temperature of E° C., and in Phase 4, the temperature was maintained for F minutes. Up to the time G minutes of the total heating time (D+F), the pressure increase was as per equation 1. In the course of Phase 4, the pressure rose in accordance with equation 2 to H bar. Over the course of 12 hours, the autoclave cooled down to room temperature in Phase 5. After this cooling, a pressure of 1 bar remained in the autoclave. In Phase 6, the pressure in the autoclave was reduced to 1 bar, and the autoclave was then purged five times with nitrogen, five times with lean air having an oxygen fraction of 5%, live times with lean air having an oxygen fraction of 10%, and subsequently five times with air. In Phase 7, an amount of J g of silicon-containing composite particles was isolated in the form of a fine black solid.

The analytical data ascertained for the resultant silicon-containing composite particles is summarized in Table 3. Electrochemical cells based on selected examples of the resultant silicon-containing composite particles were produced in accordance with example 29. The electrochemical characterization of the silicon-containing composite particles is likewise set out in Table 3.

TABLE 1

Physical properties of the porous particles used:

| Material number X | D50 particle diameter [μm] | Skeletal Density [g/cm$^3$] (He pycnometry) | BET surface area [m$^2$/g] | Gurvich volume [cm$^3$/g] | PD50 pore diameter [nm] | Carbon content [wt %] (EA) | Oxygen content [wt %] (EA) | Hydrogen content [wt %] (EA) | Nitrogen content [wt %] (EA) | Silicon content [wt %] (ICP) | Boron content [wt %] (EDX) | Micropore volume [cm$^3$/g] |
|---|---|---|---|---|---|---|---|---|---|---|---|---|
| 1 | 4.25 | 2.19 | 2255 | 1.16 | 0.80 | 93.39 | 5.45 | 0.70 | 0.46 | — | — | 0.96 |
| 2 | 3.87 | 2.23 | 1908 | 0.96 | 1.30 | 96.01 | 2.99 | 0.24 | 0.76 | — | — | 0.81 |
| 3 | 5.22 | 2.24 | 331 | 0.69 | 4.28 | 97.78 | 1.36 | 0.56 | 0.30 | — | — | 0.56 |
| 4 | 3.00 | 2.15 | 1333 | 0.65 | 1.65 | 95.68 | 2.92 | 0.84 | 0.56 | — | — | 0.53 |
| 5 | 7.61 | 2.46 | 2325 | 1.02 | 0.88 | 95.82 | 2.98 | 0.45 | 0.75 | — | — | 0.93 |
| 6 | 3.90 | 2.54 | 3164 | 1.63 | 1.30 | 94.16 | 4.78 | 0.40 | 0.66 | — | — | 1.42 |
| 7 | 4.80 | 2.31 | 1270 | 0.80 | 1.56 | 0.50 | 53.5 | 0.53 | 0.32 | 45.7 | — | 0.75 |
| 8 | 6.96 | 2.14 | 1006 | 0.58 | 1.47 | 0.56 | 0.37 | 0.41 | 59.9 | — | 42.7 | 0.46 |

TABLE 2

Parameters for examples 1 to 23 (n.d. means that for technical reasons the value was not measured):

| Example number | Material number X | Autoclave (AKX) | A | B | C | D | E | F | G | H | I | J | K | L |
|---|---|---|---|---|---|---|---|---|---|---|---|---|---|---|
| 1 | 1 | 2 | 5 | 8 | 12 | 45 | 420 | 160 | 60 | 67 | 24 | 11.4 | 50.1 | 22.4 |
| 2 | 1 | 1 | 10 | 4 | 8 | 30 | 450 | 108 | 45 | 35 | 15 | 14 | 52.6 | 5.9 |
| 3 | 1 | 1 | 5 | 4 | 8 | 50 | 454 | 130 | 70 | 35 | 15 | 9.7 | 26.3 | 5.9 |
| 4 | 1 | 1 | 5 | 3 | 6 | 50 | 454 | 748 | 70 | 20 | 10 | 7.6 | 26.3 | 4.4 |
| 5 | 1 | 2 | 10 | 6 | 12 | 80 | 451 | 188 | 105 | 61 | 15 | 14.5 | 100.2 | 16.8 |
| 6 | 1 | 1 | 7.6 | 15 | 15 | 50 | 420 | 120 | 85 | 66 | 30 | 16.8 | 40.0 | 22.1 |
| 7 | 1 | 1 | 7.6 | 14 | 14 | 60 | 430 | 170 | 83 | 62 | 28 | 16.5 | 40.0 | 20.6 |
| 8 | 1 | 1 | 7.6 | 9 | 8 | 60 | 420 | 120 | 80 | 45 | 24 | 15.0 | 40.0 | 13.3 |
| 9 | 1 | 1 | 7.5 | 12 | 11 | 55 | 420 | 120 | 80 | 58 | 26 | 16.0 | 39.5 | 17.7 |
| 10 | 1 | 2 | 4.2 | 9 | 16 | 55 | 430 | 205 | 90 | 79 | 40 | 8.8 | 42.1 | 25.2 |
| 11 | 1 | 2 | 4.6 | 9 | 16 | 115 | 424 | 185 | 140 | 84 | 39 | 10.4 | 46.1 | 25.2 |
| 12 | 2 | 3 | 60 | n.d | 12 | 100 | 420 | 120 | 107 | 62 | 27 | 146.1 | 31.5 | 17.2 |
| 13 | 2 | 2 | 2.9 | 9 | 13 | 35 | 425 | 330 | 100 | 59 | 29 | 6.2 | 25.8 | 25.2 |
| 14 | 2 | 2 | 8.0 | 10 | 16 | 42 | 420 | 168 | 55 | 85 | 37 | 13.0 | 71.2 | 28.2 |
| 15 | 2 | 1 | 11.1 | 12 | 21 | 42 | 420 | 170 | 60 | 92 | 45 | 23.4 | 51.9 | 17.7 |
| 16 | 2 | 2 | 5.1 | 6 | 10 | 40 | 420 | 150 | 80 | 49 | 19 | 8.4 | 45.4 | 16.8 |
| 17 | 3 | 2 | 5.0 | 7 | 12 | 60 | 435 | 220 | 90 | 58 | 22 | 10.0 | 40.1 | 19.6 |
| 18 | 3 | 2 | 10.0 | 7 | 12 | 80 | 455 | 240 | 90 | 78 | 25 | 15.7 | 80.7 | 19.6 |
| 19 | 4 | 2 | 4.2 | 7 | 12 | 120 | 450 | 240 | 100 | 62 | 20 | 8.4 | 42.7 | 19.6 |
| 20 | 5 | 1 | 7.5 | 15 | 14 | 50 | 416 | 150 | 55 | 70 | 26 | 17.2 | 38.9 | 22.1 |
| 21 | 6 | 1 | 5.6 | 15 | 14 | 50 | 425 | 250 | 50 | 62 | 28 | 17.5 | 26.9 | 22.1 |
| 22 | 7 | 1 | 21 | 12 | 21 | 40 | 420 | 170 | 60 | 90 | 42 | 33 | 138.1 | 17.1 |
| 23 | 8 | 1 | 22 | 12 | 21 | 43 | 420 | 170 | 60 | 91 | 43 | 34 | 120.6 | 17.7 |

Example 24

Production of Silicon-Containing Composite Particles with Repetition of Phases 2 to 6

In Phase 1, an autoclave (AK2) was filled with 6.0 g of porous material 1 and closed, wherein the charge of the porous particles is 50 g per litre of reactor volume. In Phase 2, the autoclave was evacuated and charged with 7 g of monosilane $SiH_4$ (12 bar), wherein the charge of Si is 19.63 g per litre of reactor volume. In Phase 3, the autoclave was heated to 420° C. over the course of 65 minutes. Up to this time, the pressure increase was in accordance with equation 1. In Phase 4, the temperature was held for 180 minutes, during which the pressure increased in line with equation 2 to 68 bar. Over the course of 600 minutes, in Phase 5, the autoclave cooled down to a temperature of 20° C. After reduction of the reactor pressure to 1 bar by release of gaseous reactor contents in Phase 6, the pressure was reduced to 1 mbar within a further Phase 2, and the autoclave was again charged with 7 g of $SiH_4$ (12 bar), wherein the charge of Si is 19.63 g per litre of reactor volume. Subsequently, in the second Phase 3, the autoclave was heated to 450° C. over the course of 70 minutes, and in the second Phase 4, the temperature was held for 240 minutes, during which the pressure increased to 50 bar in line with equation 2. In the last repetition of Phase 6, the pressure in the autoclave was reduced to 1 mbar, and, after the autoclave had been cooled down to 30° C. over the course of 600 minutes, the gas space of the autoclave was purged five times with nitrogen, five times with lean air having an oxygen fraction of 5%, five times with lean air having an oxygen fraction of 10%, and subsequently five times with air. In Phase 7, 12.5 g of silicon-containing composite particles were isolated from the reactor, in the form of a fine black powder.

The analytical data for the resultant silicon-containing composite particles is summarized in Table 3.

The silicon-containing composite particles were characterized electrochemically in a cell according to example 29, the specification of which is likewise set out in Table 3.

Example 25

Production of Silicon-Containing Composite Particles with Repetition of Phases 2 to 6

In Phase 1, an autoclave (AK3) was filled with 69 g of porous material 1 and closed, wherein the charge of the porous particles is 40.7 g per litre of reactor volume. In Phase 2, the autoclave was first evacuated and then charged at a temperature of 300° C. with $SiH_4$ (9.5 bar), wherein the charge of Si is 6.8 g per litre of reactor volume. In Phase 3, the autoclave was heated to 420° C. over the course of 15 minutes. Up to this time, the pressure increase was in accordance with equation 1. In Phase 4, the temperature was held for 30 minutes, during which the pressure increased in line with equation 2 to 38 bar. After reduction of the reactor pressure to 1 bar by release of gaseous reactor contents in Phase 6, the pressure was reduced to 1 mbar within a further Phase 2, and the autoclave was again charged with $SiH_4$ (11 bar), wherein the charge of Si is 7.9 g per litre of reactor volume. In the second Phase 3, the autoclave was heated to 420° C. over the course of 10 minutes, and in the second Phase 4, the temperature was held for 30 minutes, during which the pressure increased to 23 bar in line with equation 2. In the last repetition of Phase 6, the pressure in the autoclave was reduced to 1 mbar, and, after the autoclave had been cooled down to 30° C. over the course of 600 minutes, the gas space of the autoclave was purged five times with nitrogen, five times with lean air having an oxygen fraction of 5%, five times with lean air having an oxygen fraction of 10%, and subsequently five times with air. In Phase 7, 140 g of silicon-containing composite particles were isolated from the reactor, in the form of a fine black powder.

The analytical data for the resultant silicon-containing composite particles are summarized in Table 3.

The silicon-containing composite particles were characterized electrochemically in a cell according to example 29, the specification of which is likewise set out in Table 3.

Example 26

Production of Silicon-Containing Composite Particles with Multiple Repetition of Phases 2 to 6

In Phase 1, an autoclave (AK3) was filled with 180 g of porous material 1 and closed wherein the charge of the porous particles is 106.1 g per litre of reactor volume. In Phase 2, the autoclave was evacuated and then charged at a temperature of 370° C. with $SiH_4$ (9.5 bar), wherein the charge of Si is 7.1 g per litre of reactor volume. In Phase 3, the autoclave was heated to 420° C. over the course of 10 minutes. Up to this time, the pressure increase was in accordance with equation 1. In Phase 4, the temperature was held for 30 minutes, during which the pressure Increased in line with equation 2 to 24 bar. After reduction of the reactor pressure to 1 bar by release of gaseous reactor contents in Phase 6, the pressure was reduced to 1 mbar within a further Phase 2, and the autoclave was again charged with $SiH_4$ (9.5 bar), wherein the charge of Si is 5.6 g per litre of reactor volume. In the second Phase 3, the autoclave was heated to 420° C. over the course of 10 minutes, and in the second Phase 4, the temperature was held for 30 minutes, during which the pressure increased in line with equation 2 to 22 bar. After reduction of the reactor pressure to 1 bar by release of gaseous reactor contents in the second Phase 6, pressure was reduced to 1 mbar within a third Phase 2, and the autoclave was charged again at 400° C. with $SiH_4$ (9.5 bar), wherein the charge of Si is 5.6 g per litre of reactor volume. In the third Phase 3, the autoclave was heated to 420° C. over the course of 10 minutes; the temperature in the third Phase 4 was held for 30 minutes, during which the pressure increased in line with equation 2 to 20 bar. After reduction of the reactor pressure to 1 bar by release of gaseous reactor contents in Phase 6, the pressure, within a fourth Phase 2, was reduced to 1 mbar, and the autoclave was charged again at 400° C. with $SiH_4$ (11 bar), wherein the charge of Si is 6.4 g per litre of reactor volume. In the fourth Phase 3, the autoclave was heated to 420° C. over the course of 10 minutes, in the fourth Phase 4, the temperature was held for 30 minutes, during which the pressure increased in line with equation 2 to 23 bar. After reduction of the reactor pressure to 1 bar, by release of gaseous reactor contents in Phase 6, the pressure was reduced to 1 mbar, within a fifth Phase 2, and the autoclave was charged again at 400° C. with $SiH_4$ (11 bar), wherein the charge of Si is 6.4 g per litre of reactor volume. In the fifth Phase 3, the autoclave was heated to 420° C. over the course of 10 minutes; in the fifth Phase 4, the temperature was held for 30 minutes, during which the pressure increased in line with equation 2 to 23 bar. After reduction of the reactor pressure to 1 bar by release of gaseous reactor contents in Phase 6, the pressure was reduced to 1 mbar, within a sixth Phase 2, and the autoclave was charged again at 400° C. with SiH$_4$ (11 bar), wherein the charge of Si is 7.1 g per litre of reactor volume. In the sixth Phase 3, the autoclave was heated to 420° C. over the course of 10 minutes; in the sixth Phase 4, the temperature was held for 30 minutes, during which the pressure increased in line with equation 2 to 23 bar. In the last repetition of Phase 6, the pressure in the autoclave was reduced to 1 mbar, and, after the autoclave had been cooled down to 30° C. over the course of 600 minutes, the gas space of the autoclave was purged five times with nitrogen, five times with lean air having an oxygen fraction of 5%, five times with lean air having an oxygen fraction of 10%, and subsequently five times with air. In Phase 7, 376 g of silicon-containing composite particles were isolated from the reactor, in the form of a fine black powder.

The analytical data for the resultant silicon-containing composite particles is summarized in Table 3.

The silicon-containing composite particles were characterized electrochemically in a cell according to example 29, the specification of which is likewise set out in Table 3.

Example 27

Production of Silicon-Containing Composite Particles with Multiple Repetition of the Phases 2 to 6 and Reaction Control by the Reactor Pressure In Phase 1, an autoclave (AK3) was filled with 180 g of porous material 1 and closed, wherein the charge of the porous particles per litre of rector volume is 106.1 g. In Phase 2, the autoclave was evacuated and charged at a temperature of 370° C. with SiH$_4$ (9.5 bar), wherein the charge of Si is 7.1 g per litre of reactor volume. In Phase 3, the autoclave was heated to 420° C. over the course of 10 minutes. Up to this time, the increase in pressure was as per equation 1. The temperature in Phase 4 was held for 30 minutes, during which the pressure increased in line with equation 2 to 24 bar. After reduction of the reactor pressure to 1 bar by release of gaseous reactor contents in Phase 6, the pressure, within a second Phase 2 was reduced to 1 mbar, and the autoclave was charged again at 400° C. with SiH$_4$ (9.5 bar), wherein the charge of Si is 6.1 g per litre of reactor volume. In the second Phase 3, the autoclave was heated to 420° C. over the course of 10 minutes; the temperature in the second Phase 4 was held for 30 minutes, during which the pressure increased in line with equation 2 to 21 bar. After reduction of the reactor pressure to 1 bar by release of gaseous reactor contents in Phase 6, the pressure, within a third Phase 2, was reduced to 1 mbar and the autoclave was charged again at 400° C. with SiH$_4$ (9.5 bar), wherein the charge of Si is 6.1 g per litre of reactor volume. In the third Phase 3, the autoclave was heated to 420° C. over the course of 10 minutes; the temperature in the third Phase 4 was held for 30 minutes, during which the pressure increased in line with equation 2 to 20 bar. After reduction of the reactor pressure to 1 bar by release of gaseous reactor contents in Phase 6, the pressure, within a fourth Phase 2, was reduced to 1 mbar and the autoclave was charged again at 400° C. with SiH. (11 bar), wherein the charge of Si is 7.1 g per litre of reactor volume. In the fourth Phase 3, the autoclave was heated to 420° C. over the course of 10 minutes; in the fourth Phase 4, the temperature was held for 30 minutes, during which the pressure increased in line with equation 2 to 23 bar. After reduction of the reactor pressure to 1 bar by release of gaseous reactor contents in Phase 6, the pressure, within a fifth Phase 2, was reduced to 1 mbar, and the autoclave was charged again at 400° C. with Si$_H$(11 bar), wherein the charge of Si is 7.1 g per litre of reactor volume. In the fifth Phase 3, the autoclave was heated to 420° C. over the course of 10 minutes; in the fifth Phase 4, the temperature was held for 30 minutes, during which the pressure increased in line with equation 2 to 23 bar. After reduction of the reactor pressure to 1 bar by release of gaseous reactor contents in Phase 6, the pressure, within a sixth Phase 2, was reduced to 1 mbar, and the autoclave was charged again at 400° C. with SiH$_4$ (11 bar), wherein the charge of Si is 7.1 g per litre of reactor volume. In the sixth Phase 3 the autoclave was heated to 420° C. over the course of 10 minutes, in the sixth Phase 4, the temperature was held for 30 minutes, during which the pressure increased in line with equation 2 to 23 bar. After reduction of the reactor pressure to 1 bar by release of gaseous reactor contents in Phase 6, the pressure, within a seventh Phase 2, was reduced to 1 mbar and the autoclave was charged again at 400° C. with SiH$_4$ (11 bar), wherein the charge of Si is 7.1 g per litre of reactor volume. In the seventh Phase 3, the autoclave was heated to 420° C. over the course of 10 minutes. After 20 minutes in the seventh Phase 4, a pressure increase over time recorded was substantially lower. The lower steepness of the pressure curve pointed to the low surface area in the material, and the experiment was therefore discontinued at a pressure of 22.5 bar, with the pressure in the autoclave being reduced to 1 mbar. After the autoclave had been cooled down to 30° C. over the course of 600 minutes, the gas space of the autoclave was purged five times with nitrogen, five times with lean air having an oxygen fraction of 5%, five times with lean air having an oxygen fraction of 10%, and subsequently five times with air. In Phase 7, 439 g of silicon-containing composite particles were isolated from the reactor, in the form of a fine black powder.

The analytical data for the resultant silicon-containing composite particles is summarized in Table 3.

The silicon-containing composite particles were characterized electrochemically in a cell according to example 29, the specification of which is likewise set out in Table 3.

Example 28

Production of Silicon-Containing Composite Particles with in-Situ Carbon Coating In Phase 1, an autoclave (AK2) was filled with 8 g of porous material 1 and closed, wherein the charge of the porous particles per litre of reactor volume is 80.1 g. In Phase 2, the autoclave was first evacuated and then charged with SiH$_4$ (16 bar), wherein the charge of Si is 7.1 g per litre of reactor volume. In Phase 3, the autoclave was heated to 420° C. over the course of 40 minutes. Up to this time, the pressure increase was in accordance with equation 1. In Phase 4, the temperature was held for 170 minutes, during which the pressure increased in line with equation 2 to 85 bar. Over the course of 600 minutes, in Phase 5, the autoclave cooled down to a temperature of 20° C. After reduction of the reactor pressure to 1 bar by release of gaseous reactor contents in Phase 6, the pressure was reduced to 1 mbar within a second Phase 2, and the autoclave was charged with 2 g of liquid styrene. In the second Phase 3, the autoclave was heated to 650° C. over the course of 90 minutes, and in the second Phase 4, the temperature was held for 120 minutes. In Phase 6, the pressure in the autoclave was reduced to 1 bar, after which purging was carried out five times with nitrogen, five times with lean air having an oxygen fraction of 5%, five times with lean air having an oxygen fraction of 10%, and subsequently five times with air. In Phase 7, 17.3 g of silicon-containing composite particles were isolated from the reactor, in the form of a fine black powder.

The analytical data for the resultant silicon-containing composite particles is summarized in Table 3.

The silicon-containing composite particles were characterized electrochemically in a cell according to example 29, the specification of which is likewise set out in Table 3.

Example 29

Electrochemical Characterization of the Silicon-Containing Composite Particles in Use as Active Materials in Anodes of Lithium-Ion Batteries 29.71 g of polyacrylic acid (dried to constant weight at 85° C.; Sigma-Aldrich, Mw ~450 000 g/mol) and 756.6 g of deionized water were agitated by means of a shaker (290 1/min) for 2.5 h until complete dissolution of the polyacrylic acid. Lithium hydroxide monohydrate (Sigma-Aldrich) was added to the solution in portions until the pH was 7.0 (measured using WTW pH 340i pH meter with SenTix RJD probe). The solution was subsequently commixed by means of a shaker for a further 4 h. 3.87 g of the neutralized polyacrylic acid solution and 0.96 g of graphite (Imerys, KS6L C) were introduced into a 50 ml vessel and combined in a planetary mixer (SpeedMixer, DAC 150 SP) at 2000 rpm. Next, 3.40 g of the silicon-containing composite particles from each of examples 1, 6, 7, 9, 10, 11, 22, 23, 27 or 30 were stirred in at 2000 rpm for 1 minute. Then 1.21 g of an 8 percent dispersion of conductive carbon black and 0.8 g of deionized water were added and were incorporated at 2000 rpm on the planetary mixer. Dispersing them took place in the dissolver for 30 min at 3000 rpm and at a constant 20° C. The ink was degassed again in the planetary mixer at 2500 rpm for 5 minutes under reduced pressure. The completed dispersion was then applied by means of a film applicator frame having a 0.1 mm gap height (Erdchsen, model 360) to a copper foil having a thickness of 0.03 mm (Schlenk Metallfolien. SE-Cu58). The anode coating thus produced was subsequently dried for 60 minutes at 50° C. under an air pressure of 1 bar. The mean basis weight of the dry anode coating was 1.9 mg/cm$^2$ and the coating density was 0.9 g/cm$^3$.

The electrochemical studies were carried out on a button cell (CR2032 type, Hohsen Corp.) in a 2-electrode arrangement. The electrode coating was used as counter-electrode or negative electrode (Dm=15 mm); a coating based on lithium nickel manganese cobalt oxide 6:2:2 with a content of 94.0% and a mean basis weight of 15.9 mg/cm$^2$ (obtained from the company SEI) was used as the working electrode or positive electrode (Dm=15 mm). A glass fiber filterpaper (Whatman, GD Type D) impregnated with 60 µl electrolyte served as a separator (Dm=16 mm). The electrolyte used consisted of a 1.0 molar solution of lithium hexafluorophosphate in a 1:4 (v/v) mixture of fluoroethylene carbonate and diethyl carbonate. The cell was constructed in a glovebox (<1 ppm H$_2$O, O$_2$); the water content in the dry mass of all the components used was below 20 ppm.

Electrochemical testing was carried out at 20° C. The cell was charged by the cc/cv (constant current/constant voltage) method with a constant current of 5 mA/g (corresponding to C/25) in the first cycle and of 60 mA/g (corresponding to C/2) in the subsequent cycles, and, after the voltage limit of 4.2 V had been reached, charging took place with constant voltage until the current fell below 1.2 mA/g (corresponding to C/100) or 15 mA/g (corresponding to C/8). The cell was discharged by the cc (constant current) method with a constant current of 5 mA/g (corresponding to C/25) in the first cycle and of 60 mA/g (corresponding to C/2) in the subsequent cycles, until the voltage limit of 2.5 V was reached. The specific current selected was based on the weight of the coating of the positive electrode. The ratio of cell charge capacity to cell discharge capacity is referred to as the coulombic efficiency. The electrodes were selected such as to establish a capacity ratio of cathode to anode of 1:1.2.

The results of the electrochemical testing of the full cell of lithium-ion batteries comprising the active materials from examples 1, 6, 7, 9, 10, 11, 22, 23, 27 or 30 are set out in Table 3.

Comparative Example 30

Production of a Silicon-Containing Composite Particles

In a tubular reactor with a volume of 1 l, 2.2 g of the porous particles 1 were introduced, and the tubular reactor was closed. The tubular reactor was subsequently heated to a temperature of 410° C. and traversed by a gas flow of 10% SiH$_4$ in nitrogen for 5 hours. After cooling had taken place. 5.24 g of silicon-containing composite particles were isolated in the form of a black powder.

The product obtained had a silicon content of 56 wt % (ICP), a surface area of 9 m$^2$/g, a density of 2.16 g/cm$^3$ (He pycnometry) and an oxygen content of 8.76 wt %.

Electrochemical testing took place in a full cell of lithium-ion batteries in accordance with example 29. The corresponding results are likewise set out in Table 3.

FIG. 1 shows an SEM micrograph of the cross section of silicon-containing composite particles from example 1.

Figure 2:
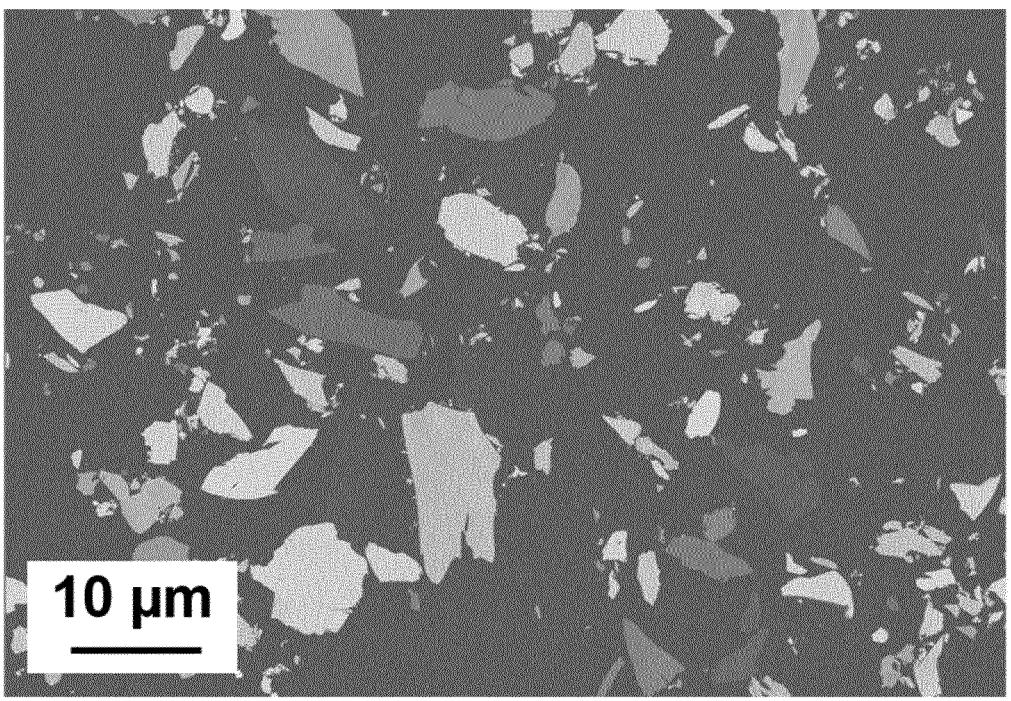
FIG. 2 illustrates the silicon distribution from Comparative Example 30.

FIG. 2 shows an SEM micrograph of the cross section of the silicon-containing composite particles from comparative example 30.

In comparative example 30, 5.24 g of material were produced in a reactor having a volume of 1000 ml by a non-inventive process over the course of 300 minutes (without heating phase); in example 1, 11.4 g of material were produced by the process of the invention in a reactor having a volume of 312 ml over the course of 195 minutes. In example 1, accordingly, the yield of material was greater by a factor of 10.7 in relation to the time and the reactor volume, as compared with the case of example 30.

Moreover, it is apparent from the comparison of the SEM micrographs of cross sections of the materials from example 1 and comparative example 30, that the material produced in example 1 has a greater homogeneity in terms of the inter-particulate silicon content. An indicator of this is the colouration of the individual particles on the SEM micrographs. A lighter colouring indicates a higher silicon content relative to all other particles, whereas a darker colouring suggests a lower silicon content relative to all other particles. A similar grey stage of two or more particles points to a similar silicon content. From this it is evident that silicon-containing composite particles can be obtained much more quickly with the process of the Invention, and is characterized, moreover, by very homogeneous deposition of the silicon in pores and on the surface of the porous particles, and is especially suitable for use as an active material in anodes for lithium-ion batteries, by virtue of its stability and electrochemical properties.

TABLE 3

Analytical data of the silicon-containing composite particles:

| Example No. | Silicon content [wt %] (ICP) | BET Surface area [m²/g] | Oxygen content [wt %] (EA) | Rev. spec. Anode capacity in the 2nd cycle [mAh/g] | Number of cycles with ≥ 80% capacity retention | Coulombic efficiency to activation [%] |
|---|---|---|---|---|---|---|
| 1 | 55 | 99.6 | 5.27 | 923 | 324 | 84 |
| 2 | 32.6 | 847.1 | 3.55 | — | — | — |
| 3 | 37 | 697.9 | 10.37 | — | — | — |
| 4 | 12.8 | 960.1 | 13.58 | — | — | — |
| 5 | 34.4 | 780.9 | 12.03 | — | — | — |
| 6 | 57 | 9.4 | 1.63 | 946 | 258 | 85 |
| 7 | 55 | 80.3 | 4.52 | 916 | 414 | 84 |
| 8 | 49 | 150.4 | 6.3 | — | — | — |
| 9 | 56 | 11.3 | 2.03 | 974 | 297 | 86 |
| 10 | 61.6 | 4.8 | 1.62 | 1056 | 39 | 87 |
| 11 | 58.8 | 2.9 | 1.71 | 1008 | 46 | 86 |
| 12 | 59.0 | 8.4 | 1.14 | — | — | — |
| 13 | 58.0 | 10.9 | 1.77 | — | — | — |
| 14 | 48.1 | 146.4 | 5.74 | — | — | — |
| 15 | 56.4 | 40.6 | 2.49 | — | — | — |
| 16 | 40.9 | 211.1 | 18.4 | — | — | — |
| 17 | 47.0 | 0.4 | 0.5 | — | — | — |
| 18 | 40 | 159.2 | 3.65 | — | — | — |
| 19 | 54.5 | 3.1 | 1.11 | — | — | — |
| 20 | 58 | 21.1 | 1.27 | — | — | — |
| 21 | 67.8 | 261.3 | 3.8 | — | — | — |
| 22 | 37.0 | 28.4 | 36.22 | 600 | 302 | 82 |
| 23 | 36.0 | 12.8 | 5.41 | 740 | 280 | 83 |
| 24 | 66.1 | 1.6 | 1.81 | — | — | — |
| 25 | 52 | 100.2 | 5.36 | — | — | — |
| 26 | 52 | 105.6 | 4.52 | — | — | — |
| 27 | 59 | 8.3 | 1.56 | 1015 | 143 | 86 |
| 28 | 50 | 2.1 | 1.01 | — | — | — |
| 30 | 56 | 9 | 8.76 | 885 | 282 | 83 |

The invention claimed is:

1. A process for preparing silicon-containing composite particles, comprising the steps of:
   (a) providing a plurality of porous particles having pores comprising micropores and/or mesopores, wherein:
       (i) a D50 particle diameter of the porous particles is in the range from 0.5 to 200 μm;
       (ii) a total pore volume of micropores and mesopores as measured by gas adsorption is in the range from 0.4 to 2.2 cm³/g;
       (iii) a PD50 pore diameter of the porous particles as measured by gas adsorption is no more than 30 nm;
   (b) combining a charge of the porous particles with a charge of a silicon-containing precursor in a batch pressure reactor, wherein the charge of the porous particles has a volume of at least 20 cm³ per litre of reactor volume (cm³/$L_{RV}$), and wherein the charge of the silicon-containing precursor comprises at least 2 g of silicon per litre of reactor volume (g/$L_{RV}$); and
   (c) heating the reactor to a temperature effective to cause deposition of silicon in the pores of the porous particles, thereby providing the silicon-containing composite particles.

2. The process of claim 1, wherein one or more porous particles are porous conductive particles.

3. The process of claim 1, wherein the porous particles are porous carbon particles.

4. The process of claim 1, wherein the porous particles have a D50 particle diameter in the range from 0.5 to 150 μm.

5. The process of claim 1, wherein the porous particles have a total volume of micropores and mesopores in the range from 0.45 to 2.2 cm³/g.

6. The process of claim 1, wherein the $PD_{50}$ pore diameter of the porous particles is no more than 25 nm.

7. The process of claim 1, wherein a volumetric ratio of micropores to mesopores is from 90:10 to 55:45.

8. The process of claim 1, wherein the porous particles have a BET surface area in the range from 750 m²/g to 4,000 m²/g.

9. The process of claim 1, wherein the silicon-containing precursor is a silicon-containing liquid or gas at 100 kPa and 20° C.

10. The process of claim 9, wherein the silicon-containing precursor comprises one or more of silane ($SiH_4$), disilane ($Si_2H_6$), trisilane ($Si_3H_8$) methylsilane, dimethylsilane and chlorosilanes.

11. The process of claim 1, wherein the charge of porous particles used in step (b) has a volume of at least 200 cm³/$L_{RV}$.

12. The process of claim 1, wherein the charge of silicon-containing precursor used in step (b) comprises at least 5 g/$L_{RV}$ of silicon.

13. The process of claim 1, wherein the batch pressure reactor contains no oxygen gas.

14. The process of claim 1, wherein step (b) further comprises adding an inert padding gas to the batch pressure reactor.

15. The process of claim 1, wherein the batch pressure reactor of step (b) contains charges consisting of the porous particles, the silicon-containing precursor and optionally an inert padding gas or hydrogen.

16. The process of claim 1, wherein the mass ratio of the porous particles to the silicon-containing precursor (silicon equivalent basis) in step (b) is from 95:5 to 40:60.

17. The process of claim 1, wherein the temperature in step (c) is in the range from 300 to 800° C.

18. The process of claim 1, wherein the batch pressure reactor in step (c) has a pressure at least 200 kPa.

19. The process of claim 1, wherein the batch pressure reactor in step (c) has a pressure at least 700 kPa.

20. The process of claim 1, wherein step (c) is carried out above the silicon-containing precursor's critical pressure.

21. The process of claim 1, wherein step (c) is carried out below the silicon-containing precursor's critical pressure.

22. The process of claim 1, wherein the porous particles are agitated during step (c).

23. The of claim 1, wherein in step c) the reactor is heated to a temperature effective to cause deposition of silicon in pores of the porous particles and on the surface of the porous particles.

24. The process of claim 1, further comprising the steps of:
   (d) evacuating by-product gases which are formed in step c) from the batch pressure reactor;
   (e) adding additional silicon-containing precursor to the batch pressure reactor, wherein the additional silicon-containing precursor gas comprises at least 2 g of silicon per litre of reactor volume (g/LRV); and
   (f) heating the reactor to a temperature effective to cause further deposition of silicon in the pores of the porous particles.

25. The process of claim 24, wherein steps (d) to (f) are repeated one or more times.

26. The process of claim 1, further comprising the step of:
(g) contacting the composite particles from step (c) with a passivating agent, wherein the composite particles are not exposed to oxygen prior to contact with the passivating agent.

27. The process of claim 24, further comprising the step of:
(h) contacting the composite particles from step (f) with a passivating agent, wherein the composite particles are not exposed to oxygen prior to contact with the passivating agent.

28. The process of claim 1, further comprising the steps of:
(i) combining the composite particles from step (c) with a pyrolytic carbon precursor; and
(j) heating the pyrolytic carbon precursor to a temperature effective to cause the deposition of a pyrolytic conductive carbon material into the pores and/or onto an outer surface of the composite particles.

29. The process of claim 24, further comprising the steps of:
(k) combining the composite particles from step (f) with a pyrolytic carbon precursor; and
(l) heating the pyrolytic carbon precursor to a temperature effective to cause the deposition of a pyrolytic conductive carbon material into the pores and/or onto an outer surface of the composite particles.

30. The process of claim 26, further comprising the steps of:
(m) combining the composite particles from step (g) with a pyrolytic carbon precursor; and
(n) heating the pyrolytic carbon precursor to a temperature effective to cause the deposition of a pyrolytic conductive carbon material into the pores and/or onto an outer surface of the composite particles.

31. The process of claim 1, wherein the steps a)-c) are divided into process Phases 1 to 7:
Phase 1: filling the batch pressure reactor with one or more porous particles,
Phase 2: charging the batch pressure reactor with one or more silicon-containing precursors,
Phase 3: heating the batch pressure reactor to a target temperature, at which the silicon-containing precursor begins to decompose in the batch pressure reactor,
Phase 4: decomposing the silicon-containing precursors, with deposition of silicon in pores and optionally on a surface of the porous particles, thereby providing the silicon-containing composite particles,
Phase 5: cooling the batch pressure reactor,
Phase 6: removing gaseous reaction products, formed in the course of the deposition, from the batch pressure reactor,
Phase 7: withdrawing silicon-containing composite particles from the batch pressure reactor,
wherein during Phase 4, a pressure in the batch pressure reactor increases to at least 7 bar.

32. The process of claim 31, wherein during Phase 4, the pressure in the batch pressure reactor changes, and this pressure change results from amount-of-substance changes as a consequence of the decomposition of silicon-containing precursor and deposition of silicon and also, optionally, of temperature change in the batch pressure reactor, with the pressure change conforming to the following equation:

$$dp_{Phase\,4} = \left(\frac{\partial p}{\partial T}\right)_{V,n_i} dT + \sum_{i,i\neq j}\left(\frac{\partial p}{\partial n_i}\right)_{V,T,n_j} dn_i,$$

wherein
pPhase 4 is the pressure in phase 4 of the reaction:
p is the pressure in the reactor;
T is the temperature in the reactor, and
V is the volume of the reactor;
n is the amount of the silicon precursor.

33. The process of claim 31, wherein the pressure in the batch pressure reactor increases in Phase 3 and Phase 4, and the pressure increase in Phase 4 is higher than the pressure increase in Phase 3, in accordance with the following equation:

$$\left[\left(\frac{\partial p}{\partial T}\right)_{V,n_i} dT + \sum_{i,i\neq j}\left(\frac{\partial p}{\partial n_i}\right)_{V,T,n_j} dn_i\right]_{Phase\,4} > \left[\left(\frac{\partial p}{\partial T}\right)_{V,n} dT\right]_{Phase\,3},$$

wherein
P is the pressure in the reactor;
T is the temperature in the reactor, and
V is the volume of the reactor;
n is the amount of the silicon precursor.

34. The process of claim 31, wherein the temperature in the batch pressure reactor in Phase 4 is in the range from 100 to 1000° C.

35. The process of claim 31, wherein the pressure in the batch pressure reactor in Phase 4 is in the range from 10 to 400 bar.

36. The process of claim 31, wherein subsequent to Phase 1, the sequence composed of Phases 2 to 5 and optionally Phase 6 is carried out at least twice, and only subsequently Phase 7 is carried out.

37. The process of claim 36, wherein in at least one Phase 2, one or more silicon-containing precursors are used, and in at least one further Phase 2, one or more carbon precursors and no silicon-containing precursors are used.

38. The process of claim 31, wherein Phase 4 is performed isothermally.

39. The process of claim 31, wherein Phase 4 is not performed isothermally, and the batch pressure reactor is heated or cooled.

40. The process of claim 31, wherein the progress of the deposition of silicon is monitored on the basis of a pressure change in the reactor.

41. The process of claim 40, wherein Phase 4 is ended when or after there is no longer any pressure increase in Phase 4.

* * * * *